May 7, 1963 H. R. BERGLAND ETAL 3,088,400

RECORDING APPARATUS

Filed Aug. 2, 1960 10 Sheets-Sheet 1

INVENTORS
HARRY R. BERGLAND
ALFRED R. WAGNER
BY Benjamin J. Barish
ATTORNEY

INVENTORS
HARRY R. BERGLAND
ALFRED R. WAGNER
BY Benjamin J. Baird
ATTORNEY

INVENTORS
HARRY R. BERGLAND
ALFRED R. WAGNER

BY Benjamin J. Barish
ATTORNEY

May 7, 1963 H. R. BERGLAND ETAL 3,088,400

RECORDING APPARATUS

Filed Aug. 2, 1960 10 Sheets-Sheet 4

INVENTORS
HARRY R. BERGLAND
ALFRED R. WAGNER
BY Benjamin J. Barish
ATTORNEY

May 7, 1963 H. R. BERGLAND ETAL 3,088,400

RECORDING APPARATUS

Filed Aug. 2, 1960 10 Sheets-Sheet 5

INVENTORS
HARRY R. BERGLAND
ALFRED R. WAGNER
BY Benjamin J. Baird
ATTORNEY

RECORDING APPARATUS

Filed Aug. 2, 1960

10 Sheets-Sheet 6

INVENTORS
HARRY R. BERGLAND
ALFRED R. WAGNER
BY Benjamin J. Barish
ATTORNEY

May 7, 1963 H. R. BERGLAND ET AL 3,088,400

RECORDING APPARATUS

Filed Aug. 2, 1960 10 Sheets-Sheet 7

INVENTORS
HARRY R. BERGLAND
ALFRED R. WAGNER
BY Benjamin J. Baird
ATTORNEY

INVENTORS.
HARRY R. BERGLAND
ALFRED R. WAGNER
BY
Benjamin J. Barish
ATTORNEY

United States Patent Office 3,088,400
Patented May 7, 1963

3,088,400
RECORDING APPARATUS
Harry R. Bergland, St. Clair Shores, and Alfred R. Wagner, Detroit, Mich., assignors to Burroughs Corporation, Detroit, Mich., a corporation of Michigan
Filed Aug. 2, 1960, Ser. No. 47,036
13 Claims. (Cl. 101—93)

This invention relates to apparatus for recording data on a record sheet, and particularly to a machine for recording information such as amounts, account numbers, etc., on a check or other document.

The invention is particularly useful in the machine described in an application for United States Letters Patent by William A. Monticello and Thomas Yesowich, filed May 31, 1960, Serial No. 33,017, now U.S. Patent No. 3,018,721, assigned to the same assignee as the present invention. It is therefore hereinafter described as embodied in that machine.

Mechanized check handling systems are characterized by having the information borne by the check or other document carried in such a way as to enable it to be read and processed by automatic equipment directly from the source document or check itself. In the United States, the banking industry has adopted magnetic ink character recognition as the common machine language most suitable for mechanized check handling. This system requires that the information be printed on the check or other document in magnetic ink using a type font that can be optically read by person as well as magnetically read by machine. The bottom edge of the check has been designated as the printing location and has been divided into a number of fields for carrying the different types of information borne by the check. Thus, the field at the rightmost portion of the check has been allotted to carrying the amount information, and the field to the left thereof has been allotted to carrying the account number information. There are several other types of information to be applied to the checks, all of which must appear in their respective fields. This application of amount, account number, etc., information to the check or other document, in a manner enabling it to be read by automatic equipment, is frequently referred to as "encoding" the check with this information, and the various fields of the check in which this information is to be applied are frequently referred to as the encoding fields.

The amount information to be encoded on the check is normally applied after the check has been completed by the maker, and generally after the check has been cashed by the payee. The above-identified patent application of Monticello et al., Serial No. 33,017, illustrates a machine where encoding the amount may be accomplished as an incident to a proving operation, i.e. where the amounts of the checks are tallied and proved with their batch tickets, etc. The account number information, on the other hand, will usually be printed at the time the checks are initially produced and before they are distributed to the bank customer, particularly in very active accounts. In some cases, however, it would not be efficient to apply the account numbers at the time the checks are printed, for example in less active accounts. Encoding the check with the account number would therefore have to be accomplished as a separate operation.

A broad object of the present invention is to adapt amount recording apparatus also for use in recording account numbers.

More specifically, an object of the present invention is to provide a single machine adaptable for use in recording or printing amount information in one field of the check and/or account number information in a different field of the check, as may be desired and selectively controlled by the operator.

A further object of the invention is to provide printing or recording apparatus with improved means for controlling the position of the record media at the time the printing or recording is to be effected thereon.

A still further object of the invention is to provide apparatus for printing or recording information in selective fields of a check or other document consistent with the high degree of printing standards required, particularly the registration of the printed characters, to enable the document to be read and processed in mechanized systems.

With the foregoing objects in mind, the invention provides a printing apparatus having printing elements settable in accordance with the information to be printed, means for feeding the record media into printing position and means for controlling the feeding means so as to select the field of the record media to be in the printing position. The apparatus described is particularly for use in printing amounts and account numbers on a check. It includes two stops in the path of the check feed, one adapted to intercept the check in the amount printing position, and the other adapted to intercept the check in the account number printing position. Presettable control means are provided to control which of the stops will be effective to intercept the check during the cycling of the machine. Thus, the control means will determine whether in that particular machine cycle the numerical values will be printed in the amount field or in the account number field. An important feature of the invention is the provision, in the control means, of means automatically controlling the check stops to position the check in one field during the first cycle of the machine, and then in the other field during the immediately succeeding cycle of the machine.

The novel features of the invention are set forth in the appended claims, but the invention itself can be best understood by the description of a machine embodying the invention appearing below in connection with the drawings.

*General Construction*

Figure 1:
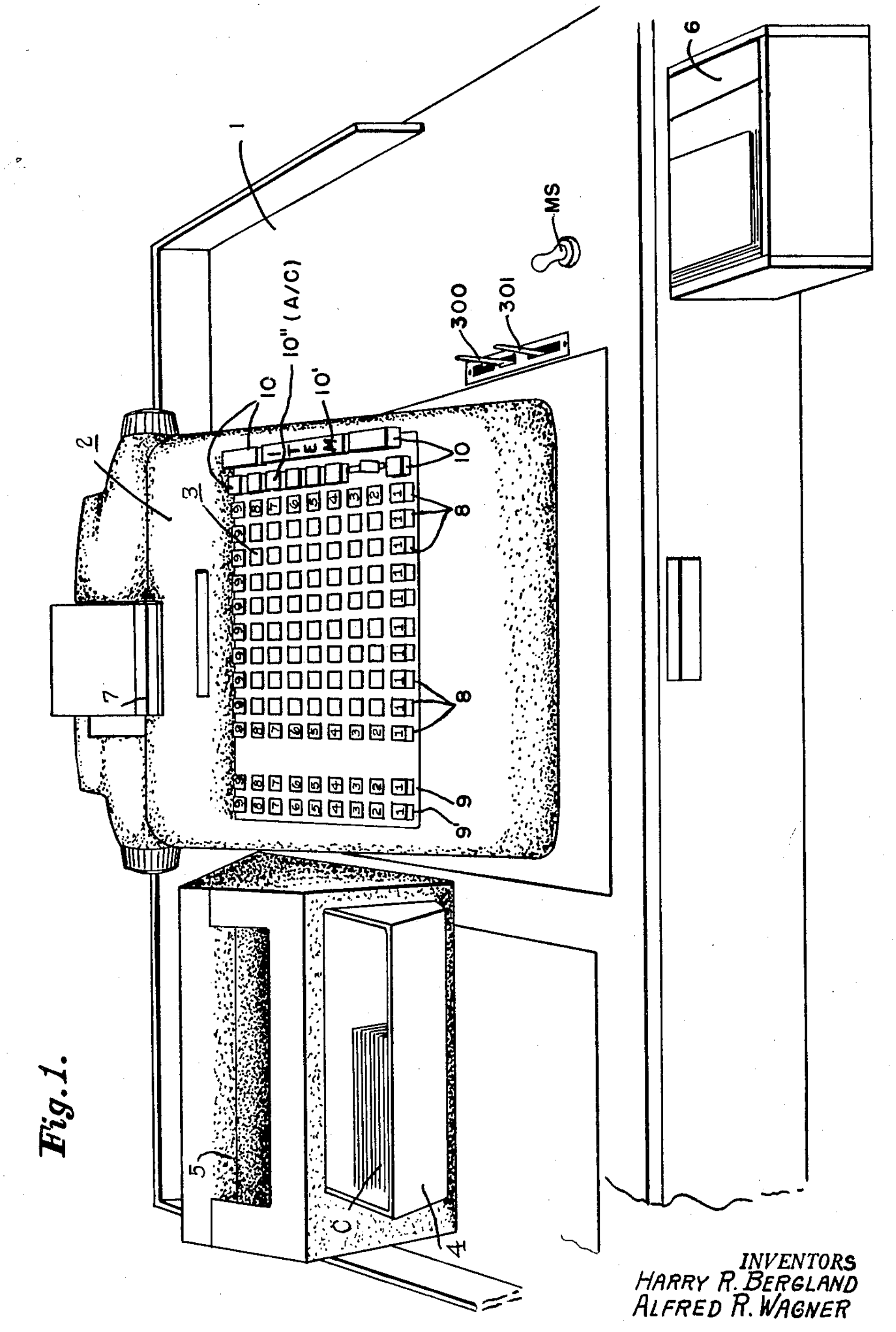
FIG. 1 is a perspective view of one form of the apparatus embodying the present invention.

The general construction of the apparatus embodying the present invention as illustrated in the drawings is very similar to that in the above-identified patent application of Monticello et al., Serial No. 33,017. That application was directed mainly to the recording or printing mechanism of the machine, and principally to the means for controlling that mechanism to obtain a high degree of registration and uniformity in the printed characters, to selectively control which orders would print and which would be suppressed, and to more evenly distribute the load on the printing drive mechanism. The present invention, as embodied in the machine of this same general construction, is directed mainly to adapting the machine for selectively printing amount information in one field, or account number information in another field, or first in one and then in the other in successive cycles of the machine. Because the inventions in the two cases have been embodied for illustrative purposes in the same general type of machine, most of the parts in the present application which are structurally and functionally the same or substantially the same as those in the above-identified Monticello et al., U.S. Serial No. 33,017 application, are identified by the same reference numerals as in that application (except for the electrical circuit leads), whereas the new parts operative in the new mechanism to be described are identified by reference numerals beginning with 300.

Figures 8, 9:
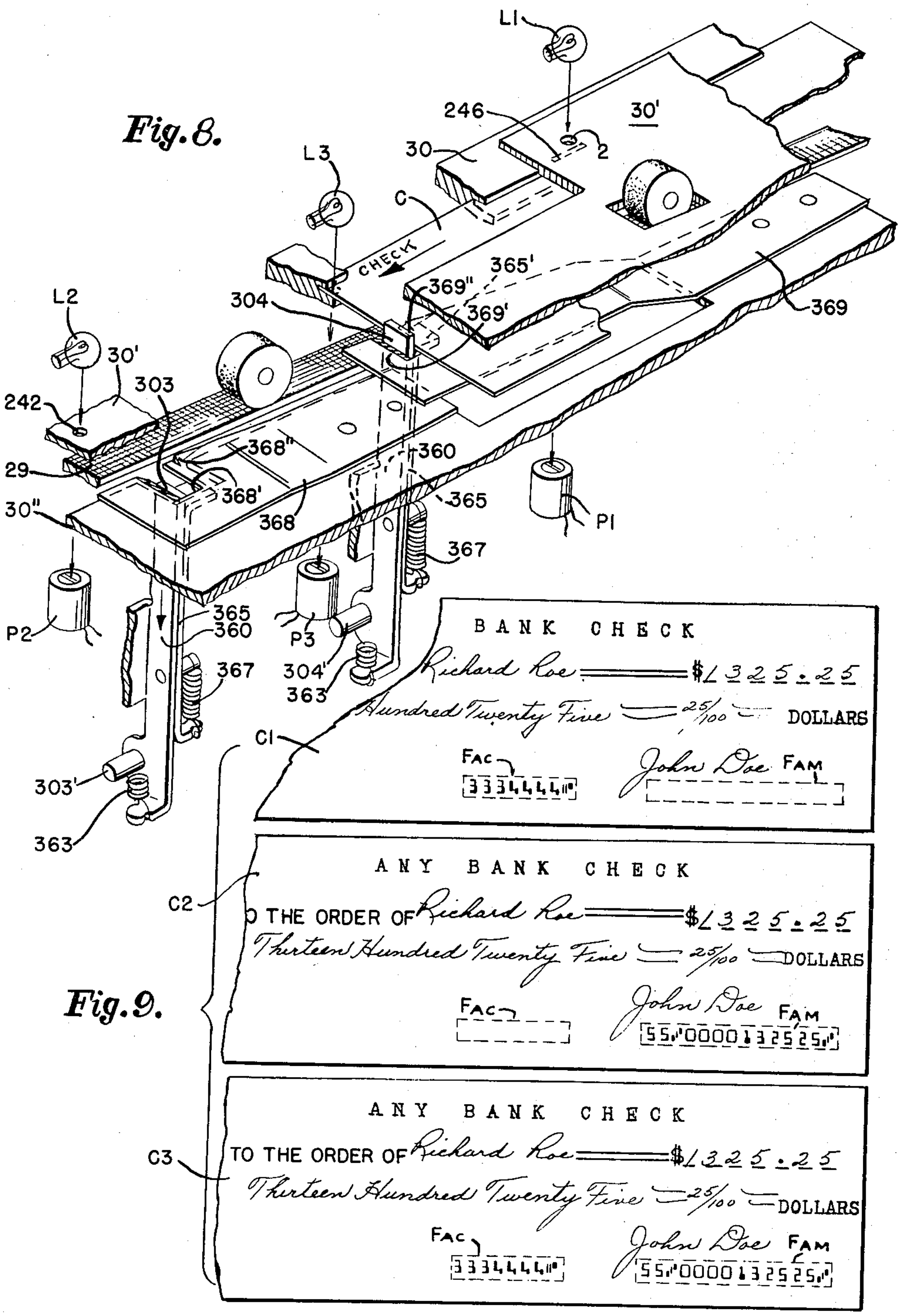
FIG. 8 is a perspective view of parts of the check positioning mechanism particularly illustrating the means for assuring registration of the check at the stops.
FIG. 9 illustrates three check specimens and the two encoding fields thereof in which printing may occur by the described apparatus.

Turning first to FIG. 9, this figure illustrates the two encoding fields of a check C in which printing may be selectively effected by controlling the apparatus to be described. The amount encoding field is generally designated as $F_{AM}$ and is found toward the bottom right-hand edge of the check (the leading edge of the check as it is fed), and the account number encoding field is generally designated as $F_{AC}$ and is just a little to the left of the amount encoding field $F_{AM}$. Check C1 of FIG. 9 illustrates the check having the account number printed in the account number field $F_{AC}$; check C2 illustrates the amount printed in the amount encoding field $F_{AM}$; and check C3 illustrates both the account number and the amount printed in the account number field $F_{AC}$ and the amount field $F_{AM}$, respectively.

The general construction of the apparatus is illustrated in FIG. 1 and includes a stand 1 carrying a printing control unit 2 having a keyboard 3 in which amount information is entered and machine operations are controlled by depressing the appropriate keys. A plurality of checks are retained in a storage hopper 4 and are manually fed into a feeding chute 5. From there they are transported by means housed within stand 1 until they are positioned in their proper locations under unit 2 at which time the amounts entered on keyboard 3 are printed thereon. After printing, the checks are fed to a receiving hopper 6 where they accumulate in stacked formation until the hopper is emptied.

Unit 2 is used in the present invention for introducing the amounts and controlling the printing thereof on the checks, but is actually a complete adding machine including not only the keyboard 3 but also its own accumulation mechanism (accumulator pinion 13, FIG. 2), its own tape printing mechanism 7, etc. Hence, it is frequently referred to in the present description as the adding machine unit. Actually, unit 2 performs many functions incident to a proving operation, where, among other functions, the totals of batches of checks are proved with respect to their batch tickets. The machine illustrated is basically a Burroughs "Series P" full keyboard adding machine that has been modified to incorporate the present invention as will be described more fully below. It includes ten columns of numerical keys 8, two columns of code identification keys 9 and 9', and a number of operation control keys 10 which occupy about the equivalent of two columns on the keyboard. Numerical keys 8 are used to enter numerical values into the machine; keys 9 and 9' are used to print various predetermined code symbols (and also exert some control over the printing as described in the above-identified Monticello et al. patent application); and the operation control keys 10 are used to initiate a cycle of operation of the machine and to exercise various other operational controls most of which are not involved in the present invention to any great extent. The present invention is primarily concerned with Item key 10' and A/C key 10'' of the operation control keys, as will be described more fully below, and therefore the other operation control keys are not labeled or described herein in the interests of simplifying the present description. The Item key 10' operates a switch which controls the cycling of the apparatus in a manner similar to the above-identified Monticello et al. application. The A/C key is normally a non-add key, insofar as its function in adding machine unit 2 is concerned, but has been modified herein by the inclusion of a switch to control the Account Number operation of the present apparatus, and is therefore also herein referred to as the Account Number key.

The present invention also utilizes a pair of levers 300 and 301 projecting through a slotted plate 302 just to the right of the keyboard 3 such as to be conveniently manipulatable by the machine operator. Both levers effect the check feeding and positioning mechanism. Lever 300 is settable to three positions and controls the programming means for determining the field of the check in which the numerical values introduced in the keyboard 3 will print, that is, in the amount field or in the account number field. Lever 301 is a reject lever to eject the check from the apparatus whenever the occasion requires, such as when a malfunction occurs and the machine is prevented from cycling. Switch MS is a manual switch the operator turns on whenever the machine is to be used to energize the motor drive.

Figure 2:
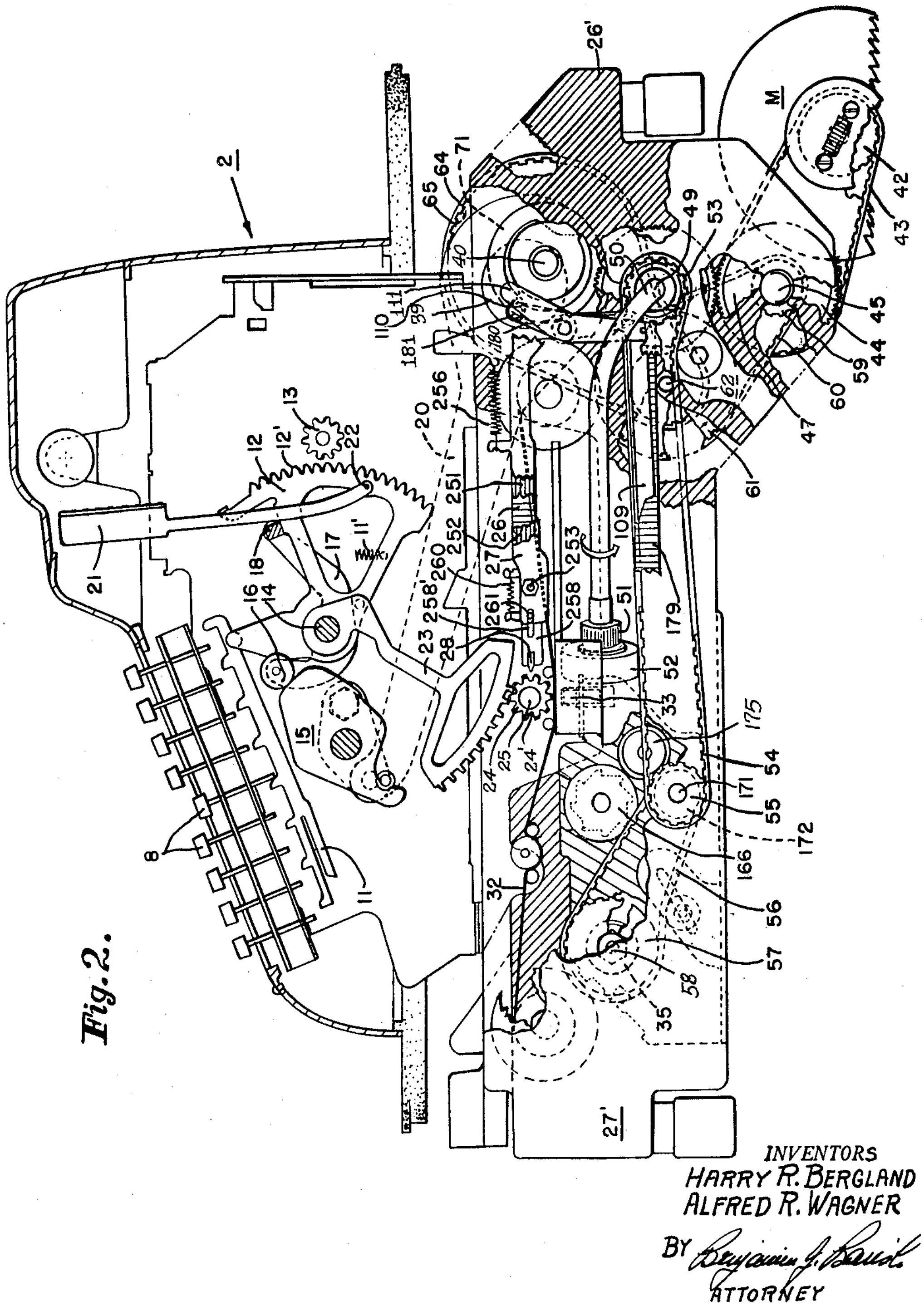
FIG. 2 is a side elevational view partly in section of the apparatus of FIG. 1.

FIG. 2 is a side elevational view of the machine through a column of numerical keys 8. Numerical values are introduced in the machine in the same manner as in the Burroughs "Series P" machine referred to above, namely by depressing the appropriate umerical key in each order which introduces a stop with respect to its index bar 11 to limit the latter's differential movement when the machine is cycled. Each index bar 11 is coupled to an adding sector 12 mounted on a common shaft 14 so that as each index bar 11 is moved forwardly of the machine during a cycle of operation, its respective adding sector 12 will be elevated (i.e. rotated counterclockwise about shaft 14) a proportionate amount. Each of the adding sectors 12, together with its respective index bar 11 coupled thereto, is urged by spring means 11' in a direction causing the adding sector to occupy an elevated position and the index bar to occupy a forward position, in the view illustrated in FIG. 2. However, such movements are restrained by a cam plate 15 having a cam roller 16 along the outer surface of the cam plate as the latter rotates. Cam roller 16 is carried on one arm of a yoke 17 pivotally mounted on shaft 14, the other arm of the yoke being formed with a bail 18 in engagement with all the adding sectors 12. Spring means (not shown) are provided to urge cam roller 16 against cam plate 15 so that bail 18 will be controlled by the movements of the cam plate.

A pitman 20 is reciprocated during each cycle of the machine from the drive mechanism to oscillate cam plate 15 in one direction during the first half cycle of the machine and to return it during the second half cycle. During the first half cycle, pitman 20 is driven rearwardly, in a manner to be described below, and thereby moves cam plate 15 counterclockwise, whereupon cam roller 16 is permitted to move downwardly by its springs, and bail 18 in engagement with the adding sectors 12 is moved upwardly, permitting the adding sectors to rise and their index bars 11 to move forwardly until limited by the depressed keys 8 in each order. The adding sectors 12 are thus elevated a differential amount corresponding to the value of its respective numerical key 8 which was depressed. This differential movement of the adding sectors 12 is transmitted to its respective accumulator mechanism through its teeth 12' in mesh with the accumulator pinions 13, and is also transmitted to its respective type bar 21 through a coupling 22, so that the type bars are also raised a differential amount depending upon the value of the key depressed in its respective order.

This differential movement begins at 45° of the machine cycle (see FIG. 11) and is completed at 115°.

The mechanism is restored during the second half cycle of operation wherein pitman 20 is moved forwardly to its normal position thereby forcing cam plate 15 to move clockwise causing cam roller 16 to rise and its bail 18 to lower. This movement of bail 18 restores the mechanism by driving the adding sectors 12, and thereby the type bars 21 and the index bars 11, to their home positions. Restoration of this mechanism begins at 245° of the machine cycle and is completed at 315°.

The foregoing structure and operation are well known and are found in the above-mentioned Burroughs "Series P" machine and in the above-identified Monticello et al. patent application. In the interest of simplifying the description of the present invention, they have been illustrated herein only insofar as is deemed necessary for an understanding of the present invention. Further details, however, are available in the Monticello et al. application.

In adapting the Burroughs "Serial P" machine 2 for use in the present invention, an adding sector extension 23 is included with each of the adding sectors 12 of the standard machine. As described above, each of the adding sectors 12 will be moved during each cycle of the machine to a differential position corresponding to the respective numerical key 8 depressed, and then will be restored to its normal position. Its adding sector 23, being coupled to that member, will likewise be moved to the proper differential position and then returned during each cycle. Each of the sector extensions continuously meshes with a printing wheel 24 (there being 14 in the machine illustrated), mounted on shaft 25 supported between frame plates 26 and 27 (see FIG. 3). Thus it is seen that printing wheels 24 are also differentially positioned during each cycle of the machine corresponding to the amounts indexed. A bail 28 moves into one of the notches 24' of all the printing wheels to align them and to lock them in position before printing. The movement of bail 28 into and out of locking position is effected by a cam on the main camshaft as to be described.

Briefly describing the operation of the apparatus, a check C inserted in the feeding chute 5 (FIG. 1) is transported by belt feeding means 29 (see FIGS. 5 and 8) through a guide plate 30 formed between check table plates 30' and 30'' to a position underlying printing wheels 24. The check is halted in this position by check stop mechanism (controlled by levers 300, 301 and to be described more specifically below) which is raised into the path of the check to intercept it in position under the printing wheels 24. Underlying the printing wheels is an impression producing mechanism for applying a hammer impact to force the check against the printing wheels and to thereby produce an impression of the amounts set up on the printing wheels. These amounts are printed on the check by means of an ink ribbon 32 passing between the printing wheels 24 and the check C.

Figure 5:
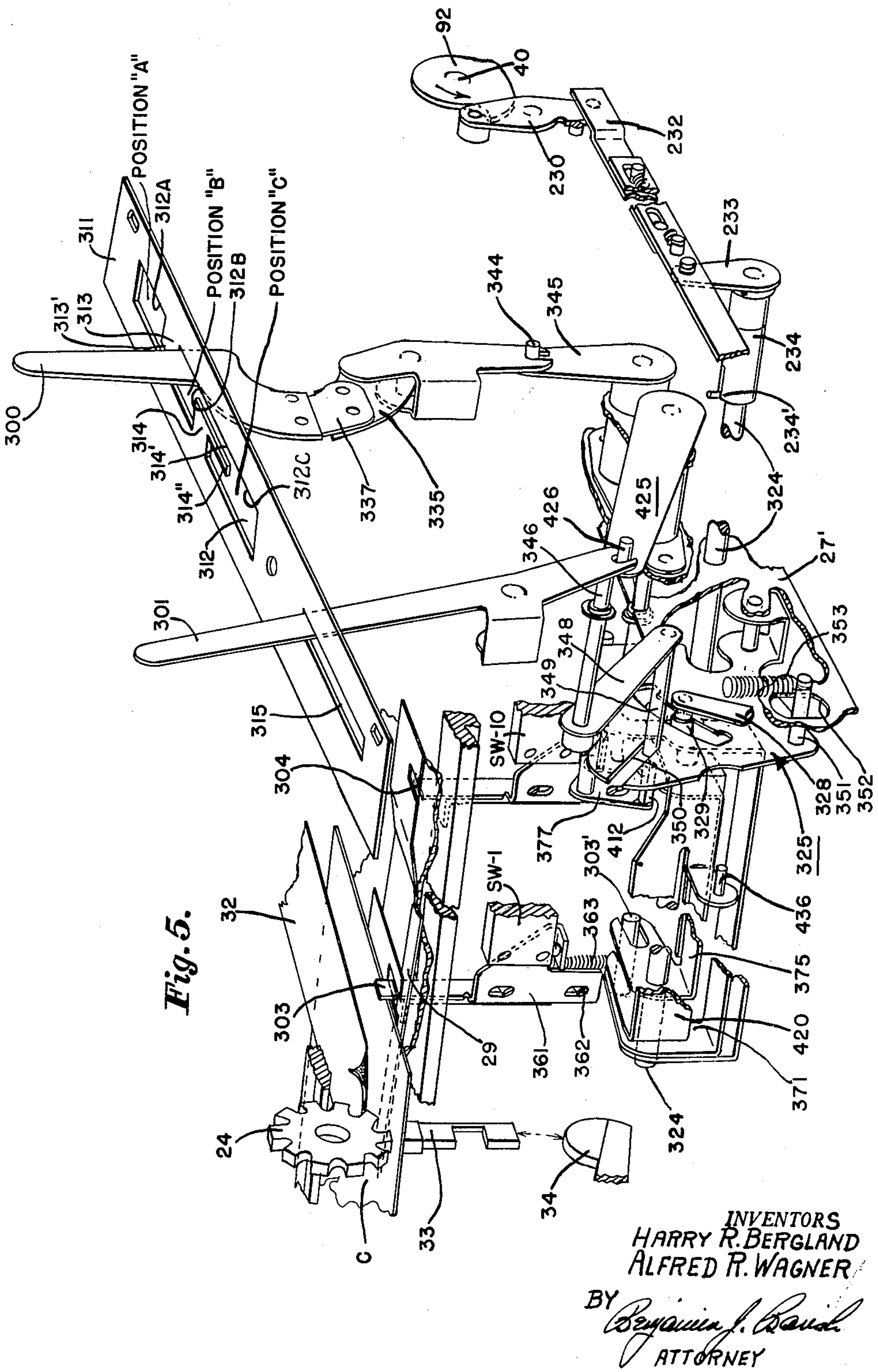
FIG. 5 is a perspective spread-apart view, with parts broken away and other parts in section, of certain elements of the check positioning mechanism and means for selectively controlling that mechanism.

In the apparatus illustrated, there are 14 printing wheels 24 (FIG. 3) each one including an interposer 33 and a hammer 34 (FIG. 5). The first printing wheel is used for applying a selected starting symbol, for example, to identify whether the numerical information to follow represents an amount or an account number; the next ten printing wheels are used for applying the numerical values introduced from amount keys 8; the next printing wheel is used for applying a stopping symbol; and the last two printing wheels are used for applying special coding symbols from symbol keys 9 and 9' as, e.g. to identify highly active accounts. See for example check C2 of FIG. 9, wherein the amount is "1325.25" and the two special coding symbols are "55." Printing from the printing wheels is effected by raising the interposers 33 at the proper time in the machine cycle to press the check against the ink ribbon 32 and the printing wheels 24, and then striking the interposers by their respective hammers 34 driven from a hammer drive roll 35 (FIG. 2). The detailed mechanism for accomplishing the foregoing is disclosed in considerable detail in the above-described Monticello et al. patent application, and is omitted here in the interests of simplifying the description of the present invention.

The present invention, as embodied in the apparatus illustrated, is primarily concerned with the printing of the amounts from printing wheels 24, and particularly, the preprogramming and control of the check stop mechanism through levers 300 and 301 to determine the check encoding field which will be in proper position for printing from printing wheels 24. Two check stops 303 and 304 are utilized, as shown particularly in FIG. 5. Check stop 303 intercepts the check to position it for printing in the amount encoding field ($F_{AM}$, FIG. 9) with respect to printing wheels 24. This stop corresponds generally to stop 31 of the above-identified Monticello et al. application. Stop 304 is provided to intercept the check to position it for printing in the account number encoding field ($F_{AC}$, FIG. 9) with respect to printing wheels 24. The above-identified Monticello et al. patent application does not illustrate a stop comparable to this latter one.

This structure, and particularly the mechanism for accomplishing the foregoing functions, will be described below in detail.

*Drive Mechanism*

As so far described, the parts that are power-driven include the check feeding belts 29 and the hammer drive roll 35. Both are continuously driven whenever the apparatus is turned on. Power is also required to cycle the machine and to control certain operations during its cycle. As described above, pitman 20 is moved rearwardly during the first half cycle of the apparatus, and is returned during the second half cycle to drive the mechanism of the adding machine unit 2. For this purpose, pitman 20 is secured to an eccentric 39 fixed to cam-shaft 40 (see FIG. 4) so that it is reciprocated during rotation of the camshaft. Besides cycling the adding machine unit 2, camshaft 40 also controls other operations of the machine as will be described below. Camshaft 40 is coupled to the drive mechanism so that it is rotated one complete revolution during each cycle of the apparatus.

The drive for all the power-driven units is derived from an electric motor M located in the left rearward side of the apparatus. As shown particularly in FIG. 4 (which is a view looking from the left rearward side), motor shaft 41 is secured to a toothed pulley 42 which is coupled by a belt 43 to another toothed pulley 44 fixed to shaft 45. The latter shaft passes from the left side of the machine through the left frame plate 26' to the right frame plate 27' of the right side of the machine and is there fixed to a gear 47 coupled to another gear 48 fixed to a shaft 49 journaled on the right frame plate 27'. Shaft 49 is connected by a flexible coupling 50 to another shaft 51 which terminates in the feeding belt drive roll 52 (FIG. 2). Thus, the feeding belt drive roll will continuously be driven all the while motor M is operating. Shaft 49 is also provided with a toothed pulley 53 transmitting power therefrom by belt 54 to toothed pulley 55 (FIG. 2), which in turn is fixed to another shaft and pulley 171 and 172, respectively, connected by belt 56 to toothed pulley 57 fixed to shaft 58 of the hammer drive roll 35. Thus the latter roll will also be continuously driven while motor M is operating.

Shaft 45, which transmits the power to the feeding drive roll 52 and the hammer drive roll 35, also includes a toothed pulley 59 coupled by belt 60 to another toothed pulley 61, the latter being fixed to a shaft 62 carrying a smaller diameter toothed pulley 63 coupled by another belt 64 to a further toothed pulley 65. The latter is coupled to camshaft 40 by a single-cycle spring clutch, generally designated 66, which is effective to cycle camshaft 40 one revolution during a cyclic operation of the machine.

Clutch 66 is controlled by a solenoid S1 having an armature 67, which, when operated, effects a coupling between toothed pulley 65 and camshaft 40. The coupling is automatically disengaged after a single cycle of revolution.

Figure 4:
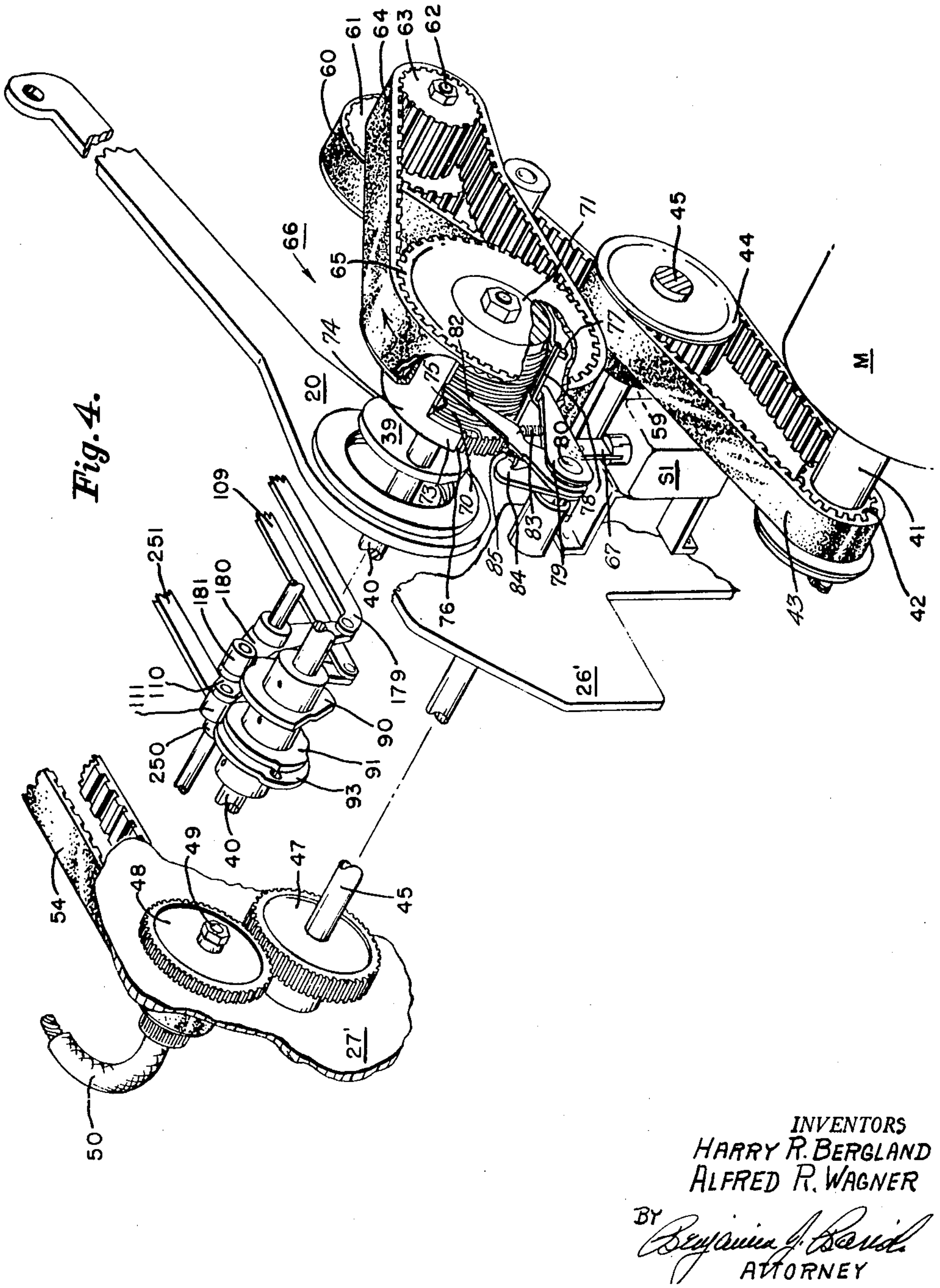
FIG. 4 is a perspective view looking from the left rearward side of FIG. 3 to more clearly show the drive mechanism.

The single-cycle spring clutch illustrated is quite similar to others that have heretofore been used, for example, as illustrated in FIG. 17 of Patent No. 2,881,895. It includes a pair of longitudinally spaced drums co-axially disposed in side-by-side relationship and spanned by a torsion spring 70 which normally is in its contracted state and tightly grips both drums to effect a coupling. Toothed pulley 65 is fixed to drum 71 of the pair. Camshaft 40 is fixed to the other drum (underlying the leftward part of spring 70 in FIG. 4), so that the camshaft is driven by the toothed pulley when spring 70 is effective to couple the two together. The latter drum is secured to the camshaft through side plate 73 which carries a cap 74 disposed between and spaced from toothed pulley 65 and its drum 71, the cap being formed with a cut-out 75 for about one-fourth its circumference for a purpose to be described. Spring 70 is disposed between the two drums and cap 74, and a part of it is exposed through cut-out 75 as can be seen in FIG. 4.

One end of spring 70 is fixed to one of a plurality of adjusting notches 76 in side plate 73 of the driven member, and the other end is turned up to form a lip at 77 so as to be engageable by an arm 78 carried by a lever 79 linked to the solenoid arrmature 67 and pivotable downwardly about pin 80 when the solenoid is operated. In its normal position, arm 78 engages the lip 77 of the spring and maintains the spring in its expanded condition such as to have it decoupled from the drum of pulley 65. When solenoid S1 is actuated, its armature 67 pulls down lever 79 such as to remove arm 78 from engagement with lip 77 of the spring thus permitting the spring to contract and to tightly grip the drum 77 of pulley 65 and the drum (not shown) of the camshaft 40 and thereby couple the camshaft to the drive.

During the cycling of the machine, solenoid S1 would normally return its armature 67 to cause arm 78 to intercept lip 77 of the spring, thereby to decouple driven camshaft 40 from pulley 65, thus assuring that the latter will operate only for a single cycle. However, means are provided for more positively assuring that the spring 70 will decouple the members after a single cycle of operation.

This means includes a feeler arm 82 pivotably mounted on pin 80 and biased toward lever 79 by spring 83. Feeler arm bears on cap 74 of the driven drum assembly by spring 83, and would therefore extend through the cut-out in the normal position of the driven assembly and would rest on coupling spring 70. There is also provided on pin 80 another arm 84 fixedly connected to lever 79, the arm 84 having a transversely extending lug 85 normally spaced from feeler arm 82 when the latter resets on the surface of the coupling spring 70 within the cut-out 75, but when the driven member is rotated so as to clear the cut-out from the feeler arm the latter is pivoted counterclockwise (as shown in FIG. 4) and engages lug 85 to pivot its arm 84 and thereby lever 79 and arm 78 connected thereto. This pivotable movement of arm 78 repositions it into the path of lip 77 of spring 70 so as to intercept the lip when it returns to the starting position. This expands spring 70 and thereby decouples the two drums. The inertia of the driven member causes it to coast somewhat past the normal stopping point, but this further expands the spring 70, and the energy thus stored immediately returns the driven member to the proper starting point. During this slight return movement of the driven member, feeler arm 82 engages the edge of the cut-out portion as illustrated in FIG. 4, and thereby assures that the driven member will not over travel in the opposite direction.

It is thus seen that camshaft 40 will be rotated one, and only one, complete revolution when the apparatus is cycled by energizing solenoid S1.

Figure 11:
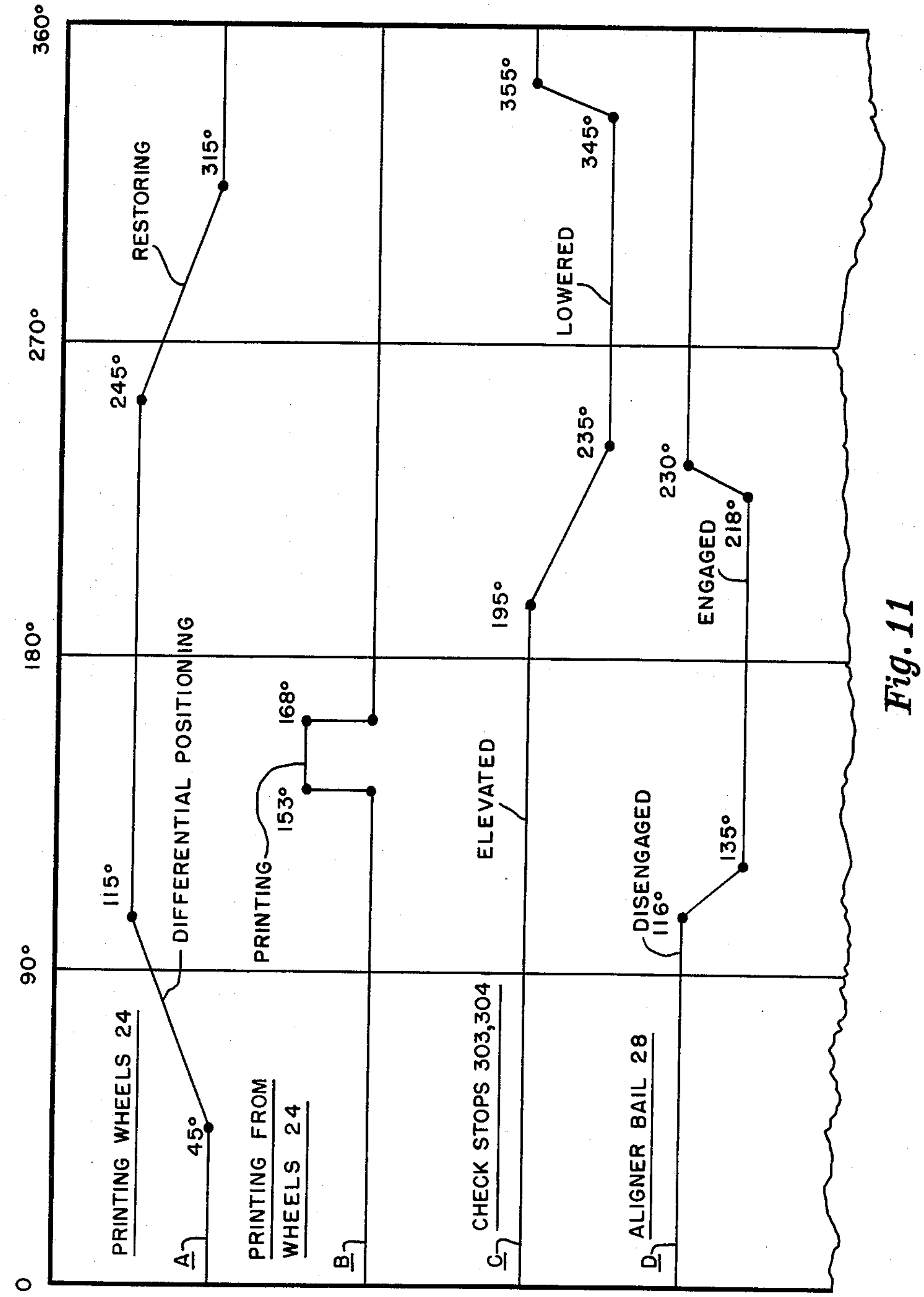
FIG. 11 is a timing diagram of certain of the mechanisms of the machine illustrated.

Eccentric 39 is carried by camshaft 40 and operates pitman 20, and thereby cam plate 15, to cycle the adding machine unit as described above. As seen in FIG. 11, (curve A) the shape of cam plate 15 is such that the adding sectors 23, and thereby printing wheels 24, are differentially positioned between 45° and 115° of the adding machine unit cycle, remain in their differential positions between 115° and 245°, and are restored between 245° and 315°.

Camshaft 40 also carries a pair of cams 90 and 91 (FIGS. 3 and 4), which, through linkage 179, 180, 181 for cam 90 and 109, 110, 111 for cam 91, control the raising of interposers 33 and the firing of hammers 34 to effect printing from printing wheels 24. The mechanism for accomplishing this is described in the above-identified Monticello et al. patent application and does not enter into the present invention, except to bring out the fact that the cams 90 and 91 are designed so that printing occurs between about 153° and 168° of the machine cycle, as indicated in the timing diagram of FIG. 11, curve B.

Camshaft 40 carries a further cam 92 (FIGS. 3 and 5) which controls stops 303 and 304 to intercept and to register the check in its proper position for printing in the amount encoding field $F_{AM}$ (FIG. 9) or in the account number encoding field $F_{AC}$. The shape of cam 92, as indicated from curve C, FIG. 11, is such that the appropriate stop (303 or 304, whichever is in its elevated position at the beginning of the machine cycle) would remain elevated until 195° of the cycle, which is after printing has occurred, would move to its lowered position between 195° and 235°, and would remain in its lowered position until 245° to enable the check to pass over the stop either to the next stop or to be ejected from the machine. The active stop would then move to its raised position between 345° and 355°, and would remain raised until the end of the cycle so that it would be found in its raised position at the beginning of the next cycle.

*Printing Wheels Alignment*

Camshaft 40 carries a still further cam 93 (FIG. 3) which controls aligning bail 28 to align and to lock the printing wheels 24 in their differential positions during printing. Cam 93 is shaped, as indicated from curve D, FIG. 11, so that bail 28 is disengaged from printing wheels between 0°–116° of the machine cycle, moves into engagement between 116°–135°, which is after the printing wheels 24 have been differentially positioned, remains engaged between 135°–218°, which is after printing has occurred, moves to disengagement from 218°–230°, and remains disengaged for the remaining part of the cycle.

Figure 3:
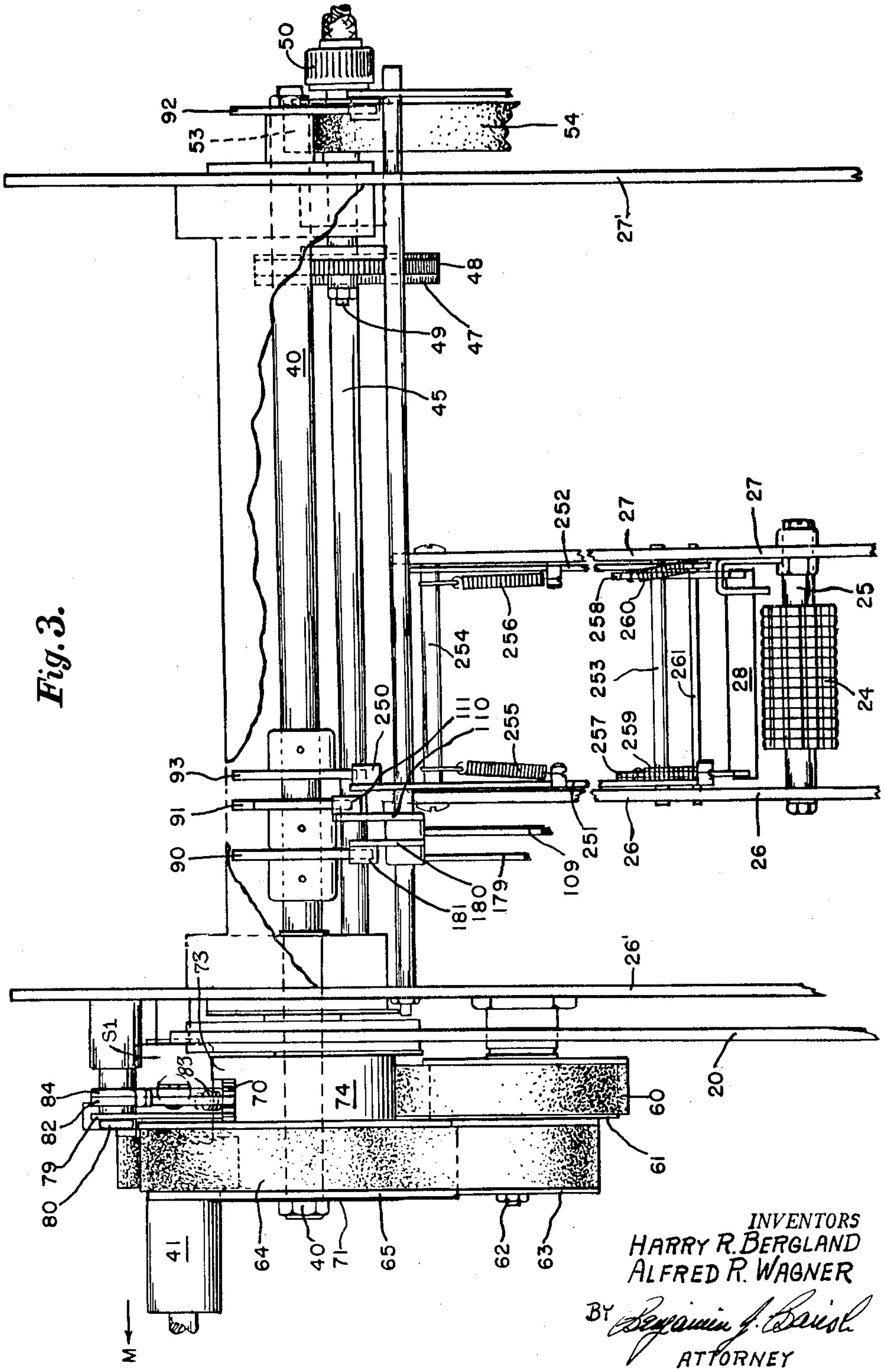
FIG. 3 is a top plan view of certain parts of the apparatus particularly showing parts of the drive mechanism and the main camshaft.

The mechanism for accomplishing this is particularly shown in FIG. 3 and includes cam follower 250 secured to an arm 251 at one side of the aligner bail 28 assembly. Arm 251 is coupled to another arm 252 by a cross-bar 253 such that cam 93 will positively drive both arms toward the printing wheels 24 tending to seat bail 28 into the wheels, thereby aligning and locking same before printing. Arms 251 and 252 are slotted (not shown) to straddle cross-bar 254 extending between frame plates 26 and 27. Springs 255 and 256 fastened between the arms and bar 254 bias the arms to their normal positions wherein the bail is out of engagement with the printing wheels.

Aligning bail 28 is wedge-shaped (see FIG. 2) and is carried by a further pair of arms 257 and 258 coupled to arms 251 and 252. Arms 257 and 258 are coupled to the positively driven arms 251 and 252 through a yielding connection, namely springs 259 and 260 fastened respectively between arms 251, 257 and arms 252, 258. Arms 257 and 258 are similarly slotted (at 258', FIG. 2) and straddle a cross-bar 261 extending between arms 251 and 252.

The arrangement is such that cam 93 drives arms 251 and 252 to move the bail toward the printing wheels 24 against springs 255 and 256. However, should bail 28 seat on a high point in one or more of the printing wheels, springs 259 and 260 will yield so as not to bind the apparatus.

*Check Stop Mechanism*

With respect to the check stop mechanism driven from cam 92 of camshaft 40, the present apparatus includes an arm 230 cooperable with cam 92, slide 232 connected to and reciprocated by arm 230, arm 233 connected to and rocked by slide 232, and rock shaft 234 fastened to the opposite end of arm 233. The foregoing elements are common to the machine disclosed in the above-identified Monticello et al application. During each cycle of the apparatus, shaft 234 is rocked counterclockwise from cam 92 to actuate the appropriate check stops 303 or 304, and is then returned to restore the mechanism. Which of the check stops 303 or 304 will be actuated depends upon the setting of control lever 300.

Control lever 300 is settable to three positions:

(*a*) When set in its rear position "A," it controls the mechanism to position the check for an Account Number operation, i.e. for printing from wheels 24 in the account number encoding field of the check. This requires that amount stop 303 be in its lowered position at the beginning of the machine cycle to permit the check to pass thereover, and that account number stop 304 be raised to intercept the check.

(*b*) When control lever is set in its middle position "B," it positions the check for an Amount operation, i.e. for printing in the amount encoding field, which therefore requires that the amount stop 303 be in its raised position at the beginning of the machine cycle. The account number stop 304 is held down to permit the check to pass over later in the machine cycle when the amount stop 303 is lowered. The condition of the mechanism illustrated in FIG. 5 is for this operation.

(*c*) When the control lever 300 is set in its front position "C," it controls the mechanism for an Amount and Account Number operation, i.e. the one where during the first machine cycle the check will be positioned for printing in the amount encoding field, and during the next succeeding cycle the check will be positioned for printing in the account number encoding field. This operation requires that at the beginning of the first cycle the amount stop 303 be raised, that the stop be lowered during the cycle, and that at the beginning of the second cycle the amount stop 303 be held down and the account number stop 304 be raised. Under this operation, the operator would print the amount by depressing the appropriate keys 8 of the keyboad 3 and cycling the machine to print that amount in the amount encoding field of the check, and would then print the account number by depressing the appropriate keys in the same keyboard 3 and recycling the machine to print that information in the account number encoding field. The check positioning is automatically effected by the control exerted from the setting of lever 300.

Reject lever 301, when it is operated, lowers both check stops 303 and 304 and thereby causes the check to be ejected by feeding belt 29. This lever is operated whenever the operator desires to eject the check without cycling the machine.

Both levers 300 and 301 project through slotted plate 311 of the housing. Lever 300 is disposed in a compound slot 312 which is divided by separators 313 and 314 into three partial slots: slot 312A, for position "A"; slot 312B, for position "B"; and slot 312C, for position "C." Slot 312A communicates with slot 312B by a channel 313' therebetween, and slot 312C communicates with slot 312B by a channel 314' therebetween. The lever is spring-biased toward position "B" so that after a position "C" operation, the lever will normally restore to position "B." The reason for this is that the Amount operations are more usual and therefore it is desired to have the mechanism restore to an Amount operation after an Amount and Account Number operation. If the lever is to be latched in position "C" for repeated Amount and Account Number operations, it would be moved to that position and then flexed sidewise until the lever drops behind the extension 314'' of the separator 314, which thereby latches the lever in that position.

When lever 300 is moved to its "A" position for an Account Number operation, it is normally retained in this position by separator 313, and if it is desired to move the lever into another position, the lever is flexed sidewise and passed through channel 313' formed by separator 313 between slots 312A and 312B.

Reject lever 301 projects through slot 315 of the slotted plate 311 and is manipulatable in this slot to eject a check whenever desired without the necessity of cycling the machine.

Figure 6:
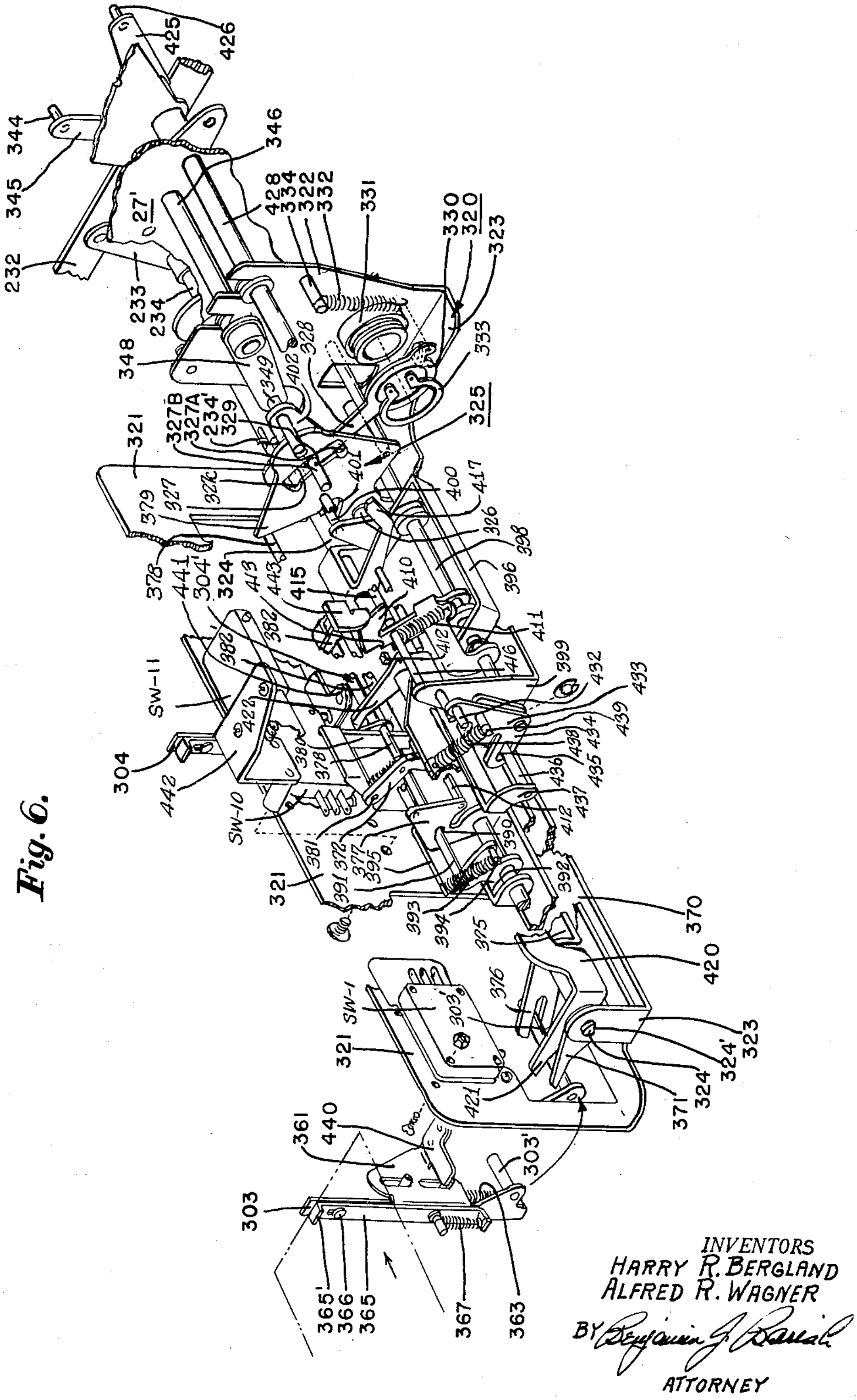
FIG. 6 is an enlarged perspective spread-apart view showing in more detail the main parts of the check positioning mechanism illustrated in FIG. 5.

Most of the elements of the check stop mechanism including stops 303 and 304 are carried by a bracket member 320 (FIGS. 6 and 7) which includes a vertical rear wall 321 extending left to right of the machine, a vertical side wall 322 extending front to rear, and an L-shaped bottom wall 323. The two check stops 303 and 304 are slidably supported from vertical wall 321, and the whole bracket assembly 320 is supported by its bottom wall 323 from the machine frame. A rock shaft 324 pinned to shaft 234 (at 234') is journaled through vertical wall 322 and an upstanding ear 323' formed at the end of bottom wall 323. Shaft 324 has a flattened surface 324' and supports many of the elements of the check stop mechanism as will be described below.

Settable lever 300 controls the positions of check stops 303 and 304 primarily through a settable program plate 325 pivotally supported by stub shaft 326 on vertical wall 322 of the bracket assembly 320. Program plate 325 is settable to three positions corresponding to positions "A," "B" and "C" of lever 300. Plate 325 therefore includes an elongated slot 327 having a groove for each of these positions. In the drawings, these grooves are identified as 327A, 327B and 327C to correspond with the "A," "B," and "C" positions of lever 300. Detent means comprising an arm 328 carrying a pin 329 seatable in grooves 327A, 327B and 327C retains program plate 325 in its set position. Arm 328 of the detent means is supported by a ring 330 carried by a hub 331 formed on vertical wall 322 and rotably retained thereon by retainer clip 333. Ring 330 is spring-urged in a direction causing pin 329 to seat in the grooves 327A, 327B and 327C by a spring 332 fastened to an ear of the ring 330 and to a pin 334 carried by vertical wall 322 of the bracket.

Figure 7:
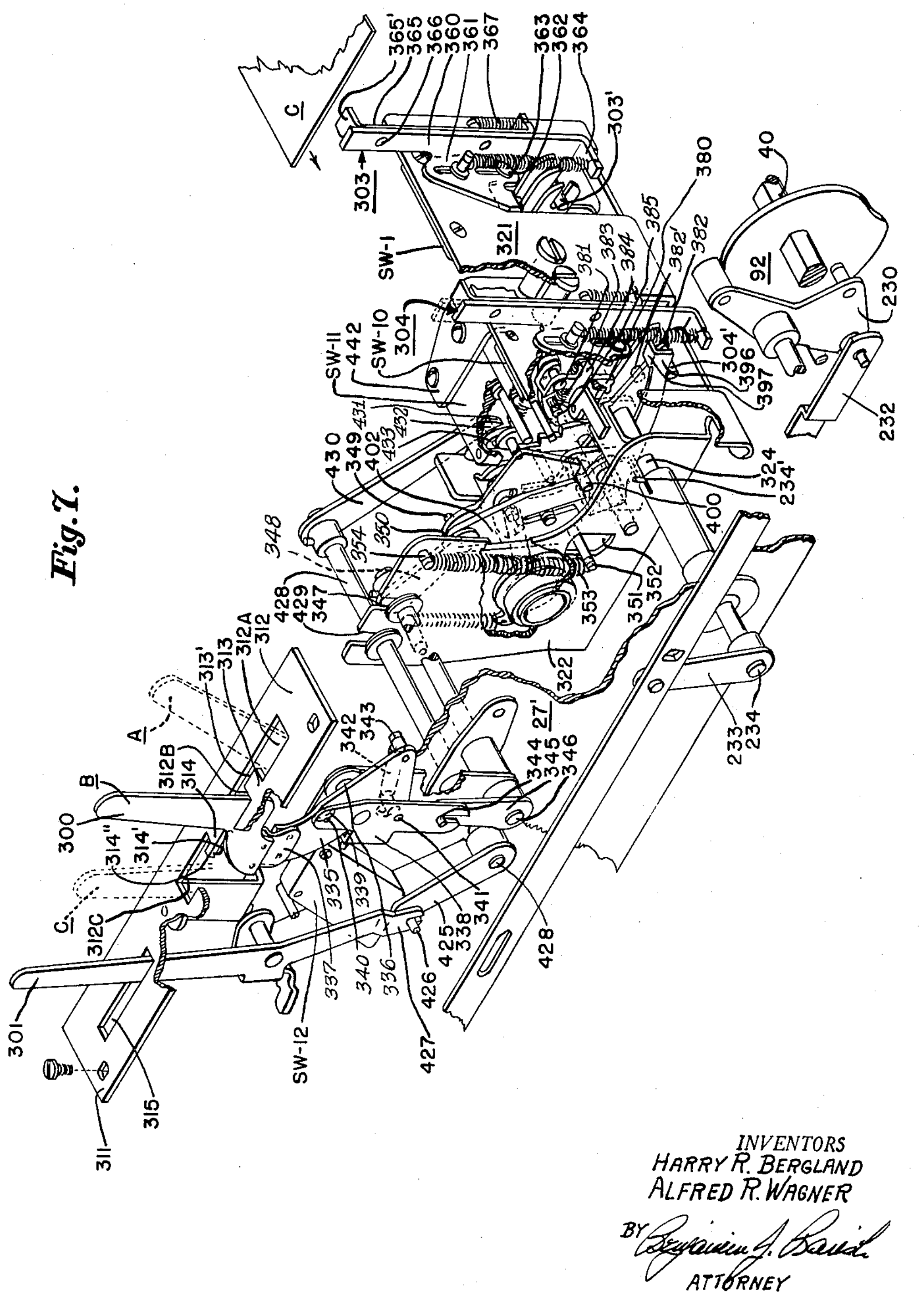
FIG. 7 is another spread-apart perspective view of the same mechanism as FIG. 6 but looking from the rear right-hand side of the apparatus.

With particular reference to FIG. 7, the mechanical linkages connecting lever 300 to program plate 325 include an arm 335 pivotal about pin 336. Arm 335 is connected to lever 300 by a resilient metal strap 337 which permits the lever to be flexed sidewise of slot 312 to one of the latching positions. Also pivotally mounted on pin 336 is another arm 338 having an aperture 339 receiving a pin 340 of arm 335. In addition, arm 338 supports another pin 341 passing through an aperture of arm 335 and fastened to a spring 342, the other end of which spring is fastened to a pin 343 carried by arm 335, the arrangement being such that when lever 300 is moved in the direction from its rear position 312A to its front position 312C, arm 338 will be rocked counterclockwise (clockwise as viewed in FIG. 7 about pin 336).

The lower end of arm 338 is forked and receives a pin 344 carried by a further arm 345 fastened to a rock shaft 346. The latter shaft extends through a slot 347 of vertical wall 322 of the bracket and supports an arm 348 within the bracket assembly, arm 348 being moved by rock shaft 346 with every movement of arm 345 and thereby of control lever 300. The end of arm 348 opposite to that fastened to rock shaft 346 carries a stud 349 which is received in a forked end 350 of program plate 325, thereby moving the program plate with arm 348 as moved by lever 300. Program plate 325 is biased in a direction tending to seat detent pin 329 in groove 327A of the program plate slot 327, this biasing means comprising a pin 351 extending through a slot 352 of vertical side wall 322 coupled by a spring 353 to a pin 354 carried by the side vertical wall 322.

It is thus seen that program plate 325 will be set to any one of the three positions in which control lever 300 is set, and that the program plate will be retained in such position by detent pin 329 seated in one of the three grooves 327A, 327B, or 327C.

Before describing how each of the check stops 303 and 304 are controlled from lever 300, it would be well to first describe the structure of the check stops themselves. The two stops are of substantially the same structure, and therefore a description of one will suffice for the other.

As mentioned earlier, both of the check stops 303 and 304 are supported from vertical wall 321 of the bracket 320. Each of the stops comprises a slide 360 (FIG. 7) mounted with its transverse axis normal to vertical wall 321 but having an inturned mounting flange 361 parallel to the vertical wall and fastened thereon by fasteners 362. Mounting flange 361 is slotted to receive these fasteners, and a spring 363 is applied between the upper fastener 362 and an inturned lip 364 formed at the bottom of slide 360, the arrangement being such that slide 360 is constantly urged by spring 363 to its upward position.

Slide 303 supports a pin 303' toward the lower end thereof, and it is this pin which cooperates with the various stop lowering elements to be described which controls the lowering of check stop 303 against the bias of its spring 363. The corresponding pin on the account number stop 304 is identified as 304'.

Each of the check stops 303 and 304 also includes another slide 365 having an inturned end 365' projecting slightly below the upper end of slide 360 for its respective stop, the end being turned in the direction in which the checks are fed. Slide 365 is slidably mounted on its cooperating slide 360 by a pin and slot connection 366 and is biased in its raised position, slightly below the upper end of slide 360, by a spring 367 fastened between slides 360 and 365. A pair of flexible plates 368 and 369 of spring copper or the like are carried between check table plates 30' and 30'' (see FIG. 8) each being formed with a slot 368' and 369'. The upper ends of slides 360 for their respective stops 303 and 304 are received in their respective slots 368' and 369' and project therethrough. However, the latter slots are not sufficiently wide to permit the inturned ends 365' for stops 303 or 304 to pass through, and therefore the inturned end will underlie its respective flexible plate 368, 369.

When the check stop 303 or 304 is in its raised position, its inturned end 365' contacts the underside of its respective plate 368 or 369 and presses the plate against the upper plate 30' of the check table and thereby intercepts the check C which travels between plates 368, 369 and the upper plate 30'. Spring 367 for its respective stop, providing a bias for end 365', also provides a spring bias for flexible plate 368 or 369 against upper check table plate 30' when the stop is in its raised position. However, when stop 303 or 304 is lowered (by an element acting on its pin 303' or 304' as will be described below), its whole stop assembly is lowered to bring its respective end 365' out of contact with plate 368 or 369, which thereby returns the plate to its normal position spaced from upper plate 30' of the check table. Accordingly, the plate 368 or 369 would be ineffective to intercept the check and would therefore permit the check to pass over that stop, either to be intercepted by the next stop or to be ejected from the machine as the case may be.

The foregoing arrangement serves to intercept the oncoming checks in such a manner as to more positively receive and position the checks in their proper places against the stop mechanism with a minimum of bounce or rebound therefrom. For this purpose, each of the flexible plates 368 and 369 may be formed with a triangle-shaped dimple 368'' and 369'' adjacent to its slot 368', 369' to further decelerate and cushion the check as it is intercepted by its stop and to more positively hold it against rebound.

Turning now to the mechanism for controlling the various elements acting on pins 303' and 304', and thereby acting to lower the stops 303 and 304, it is seen (FIGS. 6 and 7) that there are three distinct elements acting on each of the pins. One of the elements acting to depress its stop at the proper time in the machine cycle; another element acts to initially hold-down the stop before the machine cycle starts, if the program calls for that operation for that stop; and the third element is operated by the reject lever 301 to lower both the stops, and to thereby permit the check to be ejected from the apparatus without cycling the machine. The structure for accomplishing all the foregoing operations will now be described.

For depressing stop 303, a bail 370, (FIG. 6) is supported on rock shaft 324 and is formed with a pair of arms 371 and 372 at opposite ends thereof. Rock shaft 324 is longitudinally flattened at 324', and arms 371 and 372 are formed with openings having flattened ends which non-rotatably receive the flattened end 324' of the rock shaft. One of the arms 371 of bail 370 is normally disposed just above pin 303' of the amount stop 303. As mentioned above, each cycle of the apparatus rocks shaft 324 through cam 92 so that arm 371 of bail 370, moving with rock shaft 324, will tend to depress the amount stop 303 during each machine cycle. The function of arm 371 will be described below.

For purposes of holding stop 303 down before the start of the machine cycle, if the setting of lever 300 calls for that, a further bail 375 is freely mounted on rock shaft 324 and carries a forked arm 376 in which pin 303' is received. Bail 375, being freely mounted on rock shaft 324, is not rocked with the latter shaft during the normal cycling of the machine. For purposes of rocking it, the opposite end of the bail is formed with another arm 377 carrying a pin 378 projecting into the plane of program plate 325. The program plate is formed with a nose 379 engageable with pin 378 only when the program plate is rocked to its "A" position, namely when detent roll 329 seats in groove 327A of its elongated slot 327. The "A" position of lever 300 is an Amount and Account Number operation, which requires that the amount stop 303 be lowered before the machine cycles, at the time the lever is set. It is thus seen that when lever 300 is moved to its "A" position, program plate 325 is rocked to cause its nose 379 to engage and rock bail 375, and thereby its forked arm 376 which lowers the amount stop 303.

The mechanisms for depressing and holding down the account number stop 304 will now be considered.

For depressing the account number stop, arm 372 of bail 370 carries an arm 380 pivotally mounted on a pin 381 supported by arm 372. Arm 380 is cooperable with a pin 382' carried at the forward end of an arm 382 freely mounted on rock shaft 324. Arm 380 is normally urged out of alignment with pin 382′ by a spring 383 fastened between an ear 384 of arm 380 and a pin 385 carried by the upper end of arm 372. Bail 375 will be rocked with each cycle of the apparatus as described above, but since arm 380 is biased out of engagement with pin 382′, it will normally not cause arm 382, which supports pin 382′, to be lowered and thereby to lower the account number stop 304. However, when program plate 325 is in the "A" position which requires the account number stop 304 to be lowered during the machine cycle, its nose 379 rocks bail 375 by engagement with the latter's pin 378, as described above. Arm 377 of bail 375 is formed with a curved slot 390 (FIG. 6) which receives a pin 391 carired by an arm 392 freely mounted on rock shaft 324. Pin 391 bears against arm 380 and is adapted to move it into alignment wtih pin 382′ of arm 382. Arm 392, and thereby its pin 391, is normally biased by spring 393 fastened to a pin 394 supported by arm 392 and a lug 395 supported by arm 377 of bail 375, such as to have arm 380 out of alignment with pin 382′. However, when program plate 325 is set in its "A" position its nose 379 will rock pin 378, and thereby arm 392 and its pin 391 will rock arm 380 into alignment wtih pin 382′. During the machine cycle, therefore, rock shaft 324 rocking arm 372 and arm 381 carried thereby will also lower arm 382 through the engagement of arm 380 and pin 382′, and will thereby lower the account number stop 304.

For holding down the account number stop 304 in those operations calling for the depression of that stop at the beginning of the machine cycle, the apparatus includes another arm 396 engageable with pin 304′ of the account number stop 304. As can be seen from the drawings (FIG. 7), arm 396 has a bent-over lip 397 extending over arm 382, so that when arm 396 is operated to lower check stop 304, it will also carry with it arm 382. Arm 396 is freely mounted on a shaft 398 (FIG. 6) supported between vertical wall 322 and upturned ear 399 of bottom wall 323. Arm 396 supports a pin 400 which passes through a slot 401 in program plate 325 and engages the end of a further arm 402 (FIG. 7) at the other side of the program plate. Arm 402 is supported by pin 349 which sets the program plate from arm 348 and the other linkages connected to control lever 300. The arrangement is such that when control lever 300 is either in its "A" position for an Account Number operation, or in its "C" position for an Amount and Account Number operation, lever 402 does not move pin 400 of arm 396, but when the lever is moved to its "B" position for an Amount operation, the end of arm 402 engages pin 400 and presses same downwardly causing arm 396 to bear downwardly against pin 304′, and thereby to lower the check stop 304.

When control lever 300 is set in position "C" to control the machine for an Amount and Account Number operation, both stops 303 and 304 will be raised at the beginning of the first machine cycle, and amount stop 303 will be in its lowered position at the beginning of the second cycle. To accomplish this, the apparatus includes a latch 410 (best seen in FIG. 6) pivotally mounted on shaft 398. Latch 410 is spring biased by spring 411 in the direction of a square stud 412 projecting from arm 377 of bail 375 such that when the bail is rocked to lower amount stop 303, by its arm 376 bearing on pin 303′, latch 410 is urged to receive stud 412 in tooth 413 of the latch, and to thereby latch the bail in its rocked position. This also latches the amount stop in its lowered position.

Program plate 325 is provided with a stud 415 adapted to bear against latch 410 when the program plate 325 is rocked in either its "A" or "B" positions. That is, when the program plate is in its "A" position for an Account Number operation, or in its "B" position for an Amount operation, stud 415 of the program plate bears against latch 410 so as to restrain the latch from moving under the influence of its spring 411 into position to receive square stud 412 in its tooth 413 and to thereby latch bail 375 and the amount stop 303; however, when program plate 325 is in its "C" position, stud 415 is rocked free of latch 410 so as to permit the latch to be moved by its spring 411 to receive square stud 412 and thereby to latch the amount stop in its lowered position. It is thus seen that at the beginning of the first cycle when lever 300 is in its "C" position, both stops 303 and 304 will be raised, and that during the machine cycle when amount stop 303 is lowered as described above, arm 376 of bail 375 will also be lowered, thus rocking bail 375 and its square stud 412. Latch 410, being biased by its spring 411 to receive stud 412 in its tooth 413 when bail 375 is rocked, and being free of pin 415 of program plate 325, will be rocked by its spring 411 to latch bail 375 and amount stop 303 in the latter's lowered position. This will be the condition of the mechanism at the beginning of the second cycle of the machine, wherein the amount stop 303 is down and the account number stop 304 is up to receive the check for printing in the account number encoding field.

During the second cycle of the machine, for a "C" position operation, latch 410 is released to permit the amount stop 303 to rise at the proper time in the cycle. For purposes of releasing latch 410, arm 382 is provided with a pin 416 (FIG. 6) underlying latch 410 such that when arm 382 is rocked against pin 304′ to lower stop 304, as described above, pin 416 will engage the underside of latch 410, and will rock same to free stud 412 from the tooth 413 of the latch, which releases bail 375 and enables amount stop 303 to restore to its normally raised position.

The second cycle of the machine during the Amount and Account Number operation also releases the detent for program plate 325 and permits it to restore to its normal position "B" for an Amount operation. As mentioned earlier, while the machine has a capability of printing account numbers only or account numbers and amounts, the most frequent use of the machine would be for printing only amounts, and it is therefore desirable to provide automatic means tending to restore the machine for printing amounts. For this purpose, arm 382, which acts on pin 304′ to lower account number stop 304, is formed with its opposite end (at 417, FIG. 6) in alignment with detent roll 329 so that when arm 382 is rocked, its end 417 engages the detent and permits program plate 325 to be rocked rearwardly under the influence of spring 353. The program plate would tend to restore to position "A" of the lever, with detent 329 seated in groove 327A of the plate and lever 300 received in slot 412A of slotted plate 311. However, the separator 313 of the slotted plate intercepts lever 300 and retains it in slot 312B for a position "B" Amount operation. It will also be appreciated that program plate 325 is thereby also restrained in its "B" position wherein detent 329 is seated in groove 327B.

The foregoing mechanism is operative to return control level 300 to its Amount position following a complete Amount and Account Number operation. Should it be desired to retain control lever in its "C" position for repeated Amount and Account Number operations, this is done by moving control lever 300 into its "C" position and then flexing same sideways (permitted by resilient strap 337) to latch the lever behind the extension 314″ of separator 314 in slotted plate 311. This will prevent the lever 300, and thereby program plate 325, from restoring to the normal Amount position during the second cycle of the Amount and Account Number operation.

For lowering both stops 303 and 304 by reject lever 301 in order to eject the check without cycling the machine, the apparatus includes a further bail 420 freely mounted on shaft 324 and formed with a pair of arms 421 and 422 at opposite ends thereof. Arm 421 overlies pin 303′ of amount stop 303 and arm 422 overlies pin 304′ of account number stop 304, and it will thus be seen that when bail 420 is rocked about shaft 324, both of the stops 303 and 304 will be depressed.

The linkage between reject lever 301 and bail 420 is best seen in FIG. 7 and includes an arm 425 having a pin 426 received in the forked end 427 of the lever, the arm 425 being secured to a cross-shaft 428 passing through slot 429 of vertical plate 322 of the supporting bracket 320. The opposite end of shaft 428 fixedly carries another arm 430 having a forked end 431 in which is received a pin 432 of a bell crank lever 433 (FIG. 6) mounted on shaft 398 projecting through ear 399 of the bracket bottom wall 323. Another arm 434 of the bell crank lever is slotted at 435 and receives a pin 436 projecting from an ear 437 of bail 420. A spring 438 fastened between a stud 439 on bell crank 433 and the bail 420 normally biases the latter bail toward the bell crank such that arms 421 and 422 of the bail do not bear down against pins 303' and 304' of the check stops. However, when reject lever 301 is operated, it rocks bell crank 433 about pin 398, through the linkages set forth above, thereby rocking pin 436 disposed in slot 435 of the bell crank. The bail 420 carrying pin 436 is thereby rocked on shaft 324 causing arms 421 and 422 to bear down on pin 303' and 304' wherever stops 303 and 304 are lowered against the bias of their springs 363.

Means are provided in the stop mechanism for sensing the positions of stops 303 and 304. For this purpose, a normally open electric switch SW1 (FIG. 6) is secured to vertical wall 321 of the bracket assembly 320 with the switch operator overlying an ear 440 formed on the mounting flange 361 of amount stop 303, such that when the amount stop is in its lower position, switch SW1 is open, but when the amount stop is in its raised position, switch SW1 is closed. Another switch SW10 is mounted on vertical wall 321 in position overlying an ear 441 formed on the mounting flange for account stop 304 for similarly sensing the position of stop 304.

The stop mechanism carries a still further switch SW11 mounted on vertical wall 321 by a bracket 442 cooperable with an ear 443 formed on latch 410. Switch SW11 is operated when latch 410 is moved in the manner described above to latch amount stop 303 down during the first cycle of an Account Number and Amount operation.

A further switch SW12 (FIG. 7) is supported adjacent to control lever 300 and is operated by arm 338 in the mechanical linkage to the lever, the arrangement being such that when lever 300 is in its "C" or "B" position, switch SW12 is in its normal position, but when the lever is set in its "A" position (for an Account Number operation), switch SW12 is operated.

The functions of the foregoing switches will be described below in connection with the overall electrical circuit.

Means are also provided, as best illustrated in FIG. 8, for sensing the position of the Check C with respect to stops 303 and 304 to assure that the check is properly positioned for printing in the amount encoding field or the account number encoding field as the case may be.

Skew is detected by a photocell P1 adapted to receive light from a lamp L1 through an elongated slot 246 in guide plate 30 and an aperture 246' in upper plate 30' of the check table. When the check is properly positioned, slot 246 would be covered by an edge of the check which would thereby cut-off the light from photocell P1.

Proper registration of the check with respect to amount stop 304 is sensed by another photocell P2 adapted to receive light from lamp L2 through an opening 242 in the check table 30' adjacent to check stop 303, the arrangement being such that when the check is properly positioned with respect to stop 303, it blocks the light from photocell P2.

A similar arrangement is provided with respect to account number stop 304 wherein proper registration of the check with respect to that stop is sensed by a further photocell P3 adapted to receive light from a lamp L3 when the check is not in position with respect to that stop, the light impinging on photocell P3 being cut-off when the check is properly positioned.

Photocells P1, P2 and P3 are parts of conventional photocell circuits which are used to control the apparatus as will be described below in connection with the description of the over-all electrical circuit.

*Electrical Circuit*

Figure 10:
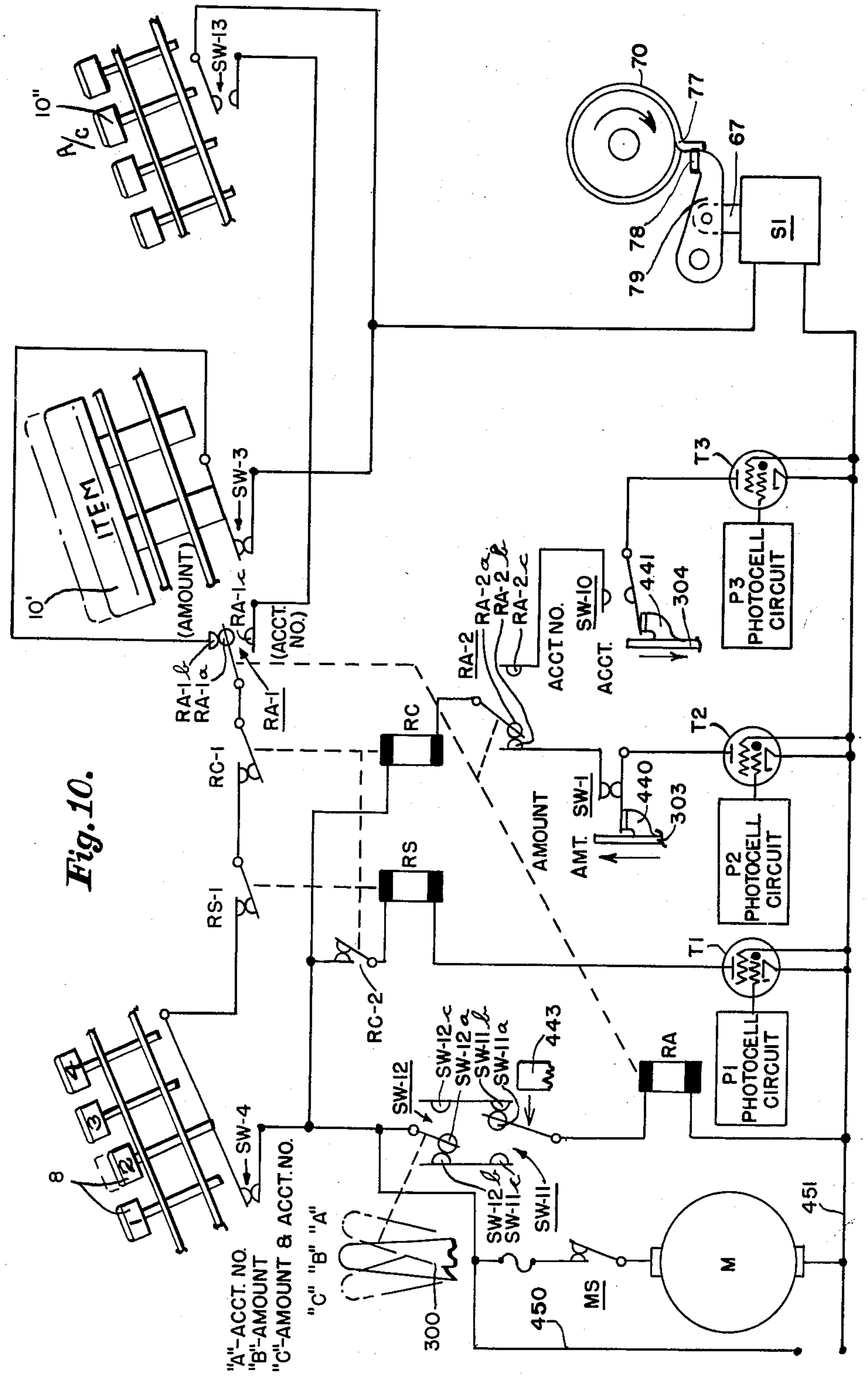
FIG. 10 is a circuit diagram illustrating in simplified form a circuit that may be used for controlling the operations of the apparatus disclosed.

FIG. 10 illustrates the essentials of the electrical circuit insofar as are necessary for an understanding of the mechanism described above. In FIG. 10, the operating elements are illustrated in the positions they would occupy during an Amount operation, since this is normally the most frequent operation of the apparatus.

Motor M is connected through manual switch MS directly across the line, leads 450 and 451. Whenever the switch is closed, the power is supplied to motor M so that it is in continuous operation. Motor M is coupled to drive the apparatus through individual cycles by the single-cycle clutch controlled by cycling solenoid S1.

The remaining description of the electrical circuit is directed to the means active to control solenoid S1 and thereby to cycle the apparatus.

Three relays are connected across the line, these relays being RA, RS and RC. Relay RA is energized only where the apparatus is to position the check for printing in the account number encoding field during that machine cycle. This may occur when lever 300 is set in position "A" for an Account Number operation, or during the second cycle of an Amount and Account Number operation when lever 300 is set in position "C." Relay RS is controlled by the skew detecting circuit including photocell P1, and must be energized (indicating that the check is properly registered as far as skew is concerned) in order to energize solenoid S1 and to thereby cycle the apparatus. Relay RC is controlled by the corner detecting circuit including photocell P2 for sensing the proper positioning of the check with respect to amount stop 303, and photocell P3 for sensing the proper positioning of the check with respect to the account number stop 304. Relay RC must also be energized, as will be more fully described below, in order to actuate solenoid S1 and to thereby cycle the apparatus.

Another condition for cycling the apparatus is that at least one key of the numerical keys 8 must be depressed, the depression of any of these keys operating switch SW4. A still further condition for energizing solenoid S1 is that the appropriate operational control key 10' and 10'' must also be depressed. That is, for an Amount operation (position "B" of lever 300, or the first cycle of position "C"), Item key 10' must have been depressed, this key controlling switch SW3; whereas for an Account Number operation (position "A" of lever 300 or the second cycle of position "C"), A/C key 10'' must have been depressed, this key operating switch SW13.

Turning now to the specific electrical circuit connections of FIG. 10, it is seen that relay RA is connected across the line through switches SW12 and SW11. Switch SW12 is a single-pole-double-throw switch in which its movable contact SW12*a* is adapted to engage a fixed contact SW12*b* or a fixed contact SW12*c*. As will be recalled earlier, switch SW12 is operated by the movement of lever 300, such that in its normal position (when lever 300 is in its "B" or "C" positions), switch SW12 has its movable contact SW12*a* in engagement with contact SW12*b*, whereas when lever 300 is in its "A" position (for an Account Number operation), movable contact SW12*a* engages contact SW12*c*.

Switch SW11 is also a single-pole-double-throw switch having a movable contact SW11*a* normally in engagement with a fixed contact SW11*b* but operable to disengage therefrom and to engage another fixed contact SW11c. As will be recalled from the earlier description, switch SW11 is operated by ear 443 of latch 410 during the first cycle of a position "C" operation. It is thus seen that contact SW11a will engage contact SW11b at the start of all machine cycles except at the start of the second machine cycle in an Amount and Account Number operation produced when lever 300 is set in position "C."

Movable contact SW12a of switch SW12 is directly connected to lead 450 of the power supply, and movable contact SW11a of switch SW11 is directly connected to one side of account number relay RA, the other side of which is connected to the other lead 451 of the power supply. Also, contact SW12b of switch SW12 is directly connected to contact SW11c of switch SW11, and contact SW12c of switch SW12 is directly connected to contact SW11b of switch SW11.

It is thus seen that when lever 300 is set in its "A" position for an Account Number operation, contact SW12a of switch SW12 engages contact SW12c to energize relay RA through contact SW11b and contact SW11a. It is also seen that when lever 300 is set in its "C" position for an Amount and Account Number operation, account number relay RA will be in an energized condition at the beginning of the second cycle of that operation, through contacts SW12a, SW12b, SW11c and SW11a, the latter having been moved into engagement with SW11c by ear 443 of latch 410 as described above. At all other times, account number relay RA will be in a de-energized condition.

Relay RA includes two sets of contacts: RA–1 in the circuit which determines whether Item key 10′ must be depressed to cycle the apparatus or whether A/C key 10″ must be depressed; and RA–2 which determines whether the amount stop 303 will be active to control the circuit or whether the account number stop 304 will be active.

Contacts RA–1 include a movable contact RA–1a which is normally in engagement with fixed contact RA–1b (for an Amount operation), but operable to engage fixed contact RA–1c when its relay RA is energized. Contact RA–1a is connected to solenoid S1 through switch SW3, and contact RA–1c is connected to the solenoid through switch SW13. It is thus seen that when relay RA is de-energized, the circuit of contacts RA–1 is completed through contact RA–1b and switch SW3, operated by Item key 10″, to solenoid S1; whereas, if relay RA is energized, the circuit is completed through contact RA–1c and switch SW13, operated by the A/C key 10″, to solenoid S1.

The other set of contacts RA–2 for relay RA is in the circuit for energizing corner relay RC. The latter relay assures that the check is properly positioned with respect to the appropriate stop (303 or 304) before the machine can cycle, contacts RA–2 selecting the stop to be active in controlling the circuit. Thus, in the normal position of contacts RA–2 as illustrated in FIG. 10, which would be present when relay RA is de-energized, movable contact RA–2a energizes fixed contact RA–2b to make the amount stop 303 effective to control the circuit. When relay RA is energized, however, as described above, contact RA–2 is operated to engage fixed contact RA–2c to make the account number stop 304 effective to control the circuit.

Contact RA–2a of the circuit for the amount stop 303 is connected to switch SW1 for amount stop 303, it being recalled that switch SW1 is closed whenever the amount stop is in its active (i.e. raised) position after intercepting the check. The circuit for the amount stop 303 also includes the means for sensing the proper position of the check with respect to the amount stop, i.e. photocell P2 adapted to receive light from lamp L2 through opening 242 (FIG. 8) when the leading corner of the check is not properly positioned with respect to the amount stop 303. The arrangement is such, as will be recalled, that the light is blocked from photocell P2 when the check is properly positioned. The gas tube T2, controlled by photocell P2, is connected between switch SW1 of the amount stop 303 and one side of the line 451. The photocell P2 is included in any suitable photocell circuit so as to prevent gas tube T2 from firing whenever light from lamp L2 impinges on the photocell, and to fire the tube when the light is blocked from the photocell as would be the case in a properly positioned check.

A similar arrangement is found in the circuit for amount stop 304. Contact RA–2c is connected to switch SW10 which is closed when the account stop 304 is in its raised position, switch SW10 being in turn connected through gas tube T3 to line 451. Gas tube T3 is controlled by a photocell circuit including photocell P3 adapted to receive light from its lamp L3 when the check is improperly positioned with respect to stop 304, and adapted to have the light blocked therefrom when the check is properly positioned.

It is thus seen that the circuit including switch SW10 for the account number stop 304 parallels the circuit including switch SW1 for amount stop 303, and that it is effective only when the account number relay RA is energized. These two parallel circuits are in series with corner relay RC, and therefore the effective one of these two circuits will control the energization of that relay. Relay RC must be energized in order to energize solenoid S1 to cycle the apparatus, which means that the active circuit, amount or account number as selected by contacts RA–2, must have its stop in the active (raised) position and must have the leading corner of the check properly registered with respect to its stop so as to block the light from its photocell.

Relay RC includes two sets of contacts, RC–1 in the circuit for energizing cycling solenoid S1, and contacts RC–2 in the circuit for energizing skew relay RS.

The circuit for skew relay RS includes, besides contacts RC–2, gas tube T1 controlled by photocell P1 in substantially the same manner as tubes T2 and T3 are controlled by their respective photocells P2 and P3. That is, photocell P1, which is in the skew-detecting optical circuit including lamp L1 and slot 246 (FIG. 8), would receive light and would thereby prevent gas tube T1 from firing whenever the check is improperly skewed, but would have the light blocked therefrom to thereby fire tube T1 whenever the check is properly positioned. When the latter condition is present, skew relay RS would be energized to close its contacts RS–1 in the circuit of cycling solenoid S1.

The S1 solenoid circuit is connected across the power source, lines 450 and 451, through switch SW4 operated by numerical keys 8, contacts RS–1 of skew relay RS, contacts RC–1 of corner relay RC, and, as selected by contacts RA–1 of account relay RA, either switch SW3 as controlled by Item key 10′ or switch SW13 as controlled by A/C key 10″. Switch SW4 is closed whenever any one of keys 8 is depressed, and it is thus seen that the depression of at least one of these keys is a condition for energizing solenoid S1 to cycle the machine. Contacts RS–1 are closed whenever skew relay RS is energized, and it is thus seen that the energization of that relay, which occurs when the check is properly positioned with respect to skew, is also a necessary condition for cycling the apparatus. Contacts RC–1 are closed when corner relay RC is energized, and it is thus seen that the energization of that relay, which occurs only when the circuit for the active stop (amount stop 303 or account number stop 304) is completed, is also a necessary condition for the cycling of the apparatus. The circuit including switch SW3 is selected by contacts RA–1 when account number relay RA is de-energized, and it is therefore seen that when that occurs, Item key 10′ must be depressed thereby closing switch SW3, to cycle the apparatus. On the other hand, the circuit including switch SW13 is selected by contacts RA–1 when account number relay RA is energized, and it is thus seen that when this occurs A/C key 10″ must be depressed, which thereby closes switch SW13, in order to cycle the apparatus.

It will be recalled that cycling of the apparatus is initiated by energizing solenoid S1 to pull down its armature 67 and lever 79 so as to remove arm 78 from engagement with the lip 77 of spring 70. This permits the spring to contract and to tightly grip the drums of pulley 65 and cam shaft 40 and to thereby couple the camshaft to the drive for a single machine cycle.

*Operation*

The overall operation of the apparatus can be best understood by a description of each of the four specific operations referred to above: namely, (1) the Amount operation, (2) Account Number operation, (3) Amount and Account Number operation, and (4) Reject operation. The Amount operation is described first and is treated the most comprehensively since this operation would normally be the one most frequently performed by the apparatus described.

(1) *Amount operation.*—For the Amount operation, control lever 300 would initially be set in its middle, or "B" position; also, Item key 10′ would have to be depressed together with at least one of the numerical keys 8.

First, however, the operator would close manual switch MS, which connects motor M across the power source. This motor drives all the power-driven units including check feeding belt 29 which is continuously running when the apparatus is turned on.

Setting lever 300 in its "B" position acts through linkages 335–349 (FIGS. 5, 6 and 7) to position program plate 325 to its "B" position where detent 329 seats in groove 327B of the plate. The mechanical linkage which moves program plate 325 also rocks arm 402 until its end engages pin 400 carried on arm 396 and presses same downwardly causing arm 396 to bear downwardly against pin 304′, and thereby to lower the account number stop 304.

Amount stop 303, however, is allowed to remain in its raised position under the bias of its spring 363, there being no elements which bear down upon its pin 303′ at this point.

Thus, the setting of lever 300 in its "B" position causes the account number stop 304 to be depressed and the amount stop 303 to be raised. The operator would then take a check C from the storage hopper 4 (FIG. 1), read the amount, introduce that amount into the keyboard 3 of adding machine unit 2 by depressing the appropriate numerical keys 8, depress Item key 10′, and insert the check into the feeding chute 5, whereupon it would be fed by belt 29 until it is intercepted by amount stop 303 for printing the introduced numerical values in the amount encoding field $F_{AM}$.

With the check intercepted and properly positioned by amount stop 303, the condition of the electrical circuit would be as illustrated in FIG. 10. Account number relay RA is de-energized since contact SW12*a* of switch SW12 engages contact SW12*b* when lever 300 is in its "B" position. Therefore, the two sets of contacts of relay RA are in their Amount positions. That is, contact RA–1*a* engages contact RA–1*b* (the Amount contact), rather than contact RA–1*c* (the Account Number contact), thereby establishing the circuit through switch SW3 (controlled by Item key 10′) to solenoid S1 which cycles the apparatus. Also, contact RA–2*a* of account number relay RA engages contact RA–2*b* thereby making the circuit including amount switch SW1 and its photocell P2 effective to control the energization of control relay PC.

Assuming that the amount stop 303 is properly in its raised position and that the light to photocell P2 is properly blocked because of the proper positioning of the check adjacent to the amount stop, it is seen that tube T2 conducts to energize relay RC through switch SW1. Therefore, contacts RC–1 in the solenoid S1 circuit and contacts RC–2 in the relay RS energizing circuit are closed, as illustrated in FIG. 10. Also, assuming that the check is properly positioned with respect to skew so as to block the light from photocell P1, gas tube T1 conducts thereby completing the energizing circuit to relay RS through previously-mentioned contacts R*c*–2. Relay RS closes its contacts RS–1 in the solenoid S1 energizing circuit. Upon the happening of all the foregoing, solenoid S1 is energized to cycle the apparatus as described above, the energization circuit comprising line 450, switch SW4 (closed by depressing numerical keys 8), contacts RS–1, contacts RC–1, contact RA–1*a*, contact RA–1*b*, switch SW3 (closed by depressing Item key 10′), solenoid S1 and line 451. The energization of the solenoid S1 causes it to pull down its armature 67 and lever 79, to couple camshaft 40 to the drive for a single cycle of operation of the apparatus.

The cyclic operation of adding machine unit 2 will first be described since the printing wheels 24, which are set from numerical keys 8, are constantly in mesh with this mechanism and will therefore follow the same cycle. Rotation of camshaft 40 reciprocates pitman 20 through eccentric 39, which in turn rocks cam plate 15 in the adding machine unit 2 causing the differential movement of adding sectors 12. The latter are moved differential amounts representative of the numerical values introduced by depressing keys 8. Since they are in mesh with printing wheels 24, the latter wheels are also moved concomitantly. The arrangement of eccentric 39, pitman 20 and cam plate 15 is such as to start the differential movement of the printing wheels at the 45° point in the cycle and to complete same (curve A, FIG. 11). The mechanism remains in its differential position from 115° until 245°, at which time it begins to restore, and it completes the restoration at 315°. Printing from printing wheels 24 must therefore occur while the mechanism is at rest in its differential position between 115° and 245° of the machine cycle. Actually, printing occurs between 153° and 168° (represented by curve B, FIG. 11), as is more fully explained in the above-identified Monticello et al. application.

At 116° in the machine cycle (curve D, FIG. 11), aligner bail 28 begins to move into engagement with printing wheels 24. This movement of bail 28 is controlled by cam 93 which drives arms 251 and 252 toward the printing wheels 24 tending to seat the bail into the wheels for aligning and locking same before printing. Bail 28 seats at 135° (before printing) and remains seated until 218°, which is after printing has occurred and the restoration of the printing elements started. Between 218° and 230°, a bail 28 is disengaged from the printing wheels.

With respect to the check stop mechanism, the timing control is effected by cam 92 of camshaft 40 (curve C, FIG. 11). As will be recalled from the earlier description, amount stop 303 is in its raised position and account number stop 304 is in its lowered position at the beginning of the machine cycle for this particular operation, whereupon the check will be intercepted and positioned for printing in the amount encoding field from printing wheels 24. Printing is completed at about 168° of the machine cycle. At about 195°, cam 92 causes the depression of amount stop 303, the mechanical linkage for accomplishing this including arm 230 which is rocked by cam 92 and which thereby shifts plate 232 rearwardly to pivot arm 233 and thereby shaft 234 and rock shaft 324 coupled thereto. As will be recalled, the rocking of shaft 324 rocks bail 370, non-rotatably received thereon, to cause arm 371 of the bail to bear down against pin 303′ of amount stop 303. This causes the amount stop to move downwardly between about 195° and 235° of the machine cycle, against the action of its spring 367. It remains down until about 345° and then moves to its raised position where it is found at the beginning of the next machine cycle, all as controlled by cam 92.

As soon as the amount stop 303 is lowered, the check is transported thereover by feeding belt 29 into the receiving hopper 6, whereupon the machine would be in condition for another cycle of operation upon the completion of that machine cycle.

(2) *Account Number operation.*—For an Account Number operation, control lever would be set by the operator to its rear, or "A," position; also, A/C key 10″ would be depressed.

Setting lever 300 in its "A" position acts through linkages 335–349 (FIGS. 5–7) to position program plate 325 to its "A" position where detent 329 seats in groove 327A of the plate. The mechanical linkage which moves the program plate 325 also removes arm 402 from engagement with pin 400 carried on arm 396, whereby the account number stop 304 is permitted to rise under the influence of its spring 363. This movement of the program plate 325 also causes its nose 379, bearing against pin 378, to rock bail 375 which thereby lowers arm 376 carrying with it pin 303′ and the amount stop 303. The rocking of bail 375 also positions arm 380 in alignment with pin 382′ carried by arm 382 overlying pin 304′ of the account number stop, which causes the lowering of stop 304 during the machine cycle.

Thus, the setting of lever 300 to its "A" position lowers amount stop 303; permits account number stop 304 to assume its normal raised position for intercepting the check; and conditions the account number stop mechanism for actuation during the machine cycle as controlled by cam 92.

The operator would then introduce the account number in keyboard 3 of adding machine unit 2 by depressing the appropriate numerical keys 8. The operator would also have to depress A/C key 10″ (as distinguished from Item key 10′ in the previously described Amount operation) and would then insert the check into the feeding chute 5 whereupon it would be fed by belt 29 past the depressed amount stop 303 until it is intercepted by the raised account number stop 304 for printing the introduced numerical values in the account number encoding field $F_{AC}$.

With the check intercepted and properly positioned by the account number stop 304, the condition of the electrical circuit would be the same as illustrated in FIG. 10 and as described above in connection with the Amount operation, with the following exception: Setting lever 300 to its "A" position would have actuated switch SW12 so that its movable contact SW12*a* engages contact SW12*c*, instead of SW12*b* as in the previous operation. This would energize account number relay RA through the circuit including contact SW12*c* of switch SW12 and contacts SW11*b* and SW11*a* of switch SW11. The energization of relay RA actuates its two sets of contacts RA–1 and RA–2 to control the circuit for an Account Number operation. That is, in RA–1, contact RA–1*a* is actuated to engage RA–1*c* which thereby places switch SW13 (controlled by A/C key 10″) in the energizing circuit of cycling solenoid S1. Also, in RA–2, contact RA–2*a* engages contact RA–2*c* thereby placing the account number circuit (including switch SW10, photocell P3 and tube T3) in the energizing circuit of corner relay RC. Assuming that the check is properly positioned with respect to the account number stop 304, that a numerical value has been introduced by depressing numerical keys 8, and that the A/C key 10″ has also been depressed, it is seen that solenoid S1 will be energized to cycle the apparatus. The energizing circuit for solenoid S1 includes line 450, switch SW4, contacts RS–1, contacts RC–1, contact RA–1*a*, contact RA–1*c*, switch SW13, solenoid S1 and line 451.

The cycling of the apparatus will differentially position the printing wheels 24 at 115° in the cycle, will cause the aligner bail to seat in the wheels at 135°, and will effect printing between 153° and 168°, all as described above. At about 195°, cam 92 will again rock shaft 324 as described above. In this Account Number operation, the rocking of shaft 324 will depress the account number stop 304 in the following manner: The rocking of shaft 324 also rocks bail 370 since the latter bail is non-rotatably received on that shaft. Arm 371 of bail 370 will lower, but since the amount stop 303 and its pin 303′ had been lowered before the machine was cycled, this rocking of bail 370 will not affect the amount stop. However, arm 372 of bail 370 causes arm 380 to also rock since it is carried by arm 372, and since arm 380 had been positioned in alignment with pin 382′ as described above during the setting of control lever 300, arm 380 bears down on pin 382′ to lower its arm 382. Since arm 382 overlies pin 304′ of the account stop 304, the lowering of arm 382 will also lower the account number stop 304.

Accordingly, the account number stop will be lowered between about 195° and 235° of the machine cycle and will remain in its lowered position until about 345°, all as controlled by cam 92 as described above. As soon as the account number stop 304 is lowered out of the path of the check, the check is transported thereover by feeding belt 29 into the receiving hopper 6. At about 345° of the machine cycle, the account number stop 304 returns to its raised position, as controlled by cam 92, where it is found at the beginning of the next machine cycle for an Account Number operation.

Since control lever 300 is normally biased by strap 337 away from channel 313′ of slotted plate 311 in which it moves, the setting of the lever in its "A" position will normally latch it in that position so that repeated operations of the machine will produce repeated Account Number operations. If it is desired to set the lever in another position, the operator would flex the lever sideways and pass it through channel 313′ to either its "B" or "C" positions, to effect the operation corresponding to that position.

(3) *Amount and Account Number operations.*—This operation takes place in two cycles of the machine. It is effected when control lever 300 is set in its forward, or "C," position. The first cycle of the machine prints the information in the amount field $F_{AM}$ of the check, and therefore the Item key 10′ would have to be depressed together with the numerical keys 8 representative of the amount information to be printed. The immediately succeeding cycle prints the information in the account number field $F_{AC}$ of the check and therefore requires the depression of A/C key 10″ together with the appropriate numerical keys 8 representative of the account number to be printed.

Setting lever 300 in its "C" position acts through linkages 335–349 to position program plate 325 to its "C" position where detent 329 seats in groove 327C of the plate. The mechanical linkage which moves the program plate 325 also rocks arm 402 to remove its end from engagement with pin 400 carried on arm 396, and therefore the account number stop 304 is permitted to rise to its normal raised position under the influence of its spring 363. Also, the movement of program plate 325 removes its nose 379 from engagement with pin 378, so that bail 375 and its arm 376, straddling pin 303′ of the amount stop 303, are permitted to assume their normal positions by spring 363 wherein the amount stop is in its raised position. Thus, it is seen that the setting of lever 300 in the "C" position permits both the amount stop 303 and the account number stop 304 to assume their raised positions before the machine is cycled.

The first cycle of the machine is to print the amount on the check in the amount encoding field $F_{AM}$, and the operator would therefore introduce that amount into keyboard 3 by depressing the appropriate numerical keys 8. The operator would also have to depress Item key 10′. The insertion of the check into the feeding chute 5 would cause same to be fed by belt 29 until intercepted by amount stop 303, since that is the first of the two raised stops in the path of the check. With the check intercepted and properly positioned by amount stop 303, the condition of the electrical circuit would be exactly the same as in the above-described Amount operation and as illustrated in FIG. 10. It will be recalled that while lever 300 is now set in its "C" position, this does not change the condition of electrical switch SW12 from that illustrated in FIG. 10, since that switch is actuated only when the lever is moved to its "A" position.

The circuit to cycling solenoid S1 is completed in the same manner as in the above-described Amount operation, whereupon the machine will go through the same cycle of operation as described in connection with the Amount operation, with the exception that latch 410 will be operative during the cycle to latch the amount stop 403 down and to prevent it from restoring to its raised position as would normally occur during an Amount operation. It will be recalled that stud 415 carried by program plate 325 normally bears against latch 410 when the program plate is in its "A" or "B" positions, restraining the latch from moving into position to receive square stud 412 in its tooth 413 and to thereby latch bail 375 and the amount stop 303. However, in the "C" position of lever 300 and program plate 325, stud 415 is rocked free of latch 410 so as to permit the latch to be moved by its spring 411 to receive square stud 412 and thereby to latch the amount stop in its lowered position. Thus, during this first cycle of an Amount and Account Number operation, when amount stop 303 is lowered by cam 92 as described above (the lowering taking place between 195° and 235°), latch 410 will receive square stud 412 carried by bail 375 and will latch that bail and the amount stop in the latter's lowered position, until the latch is released.

The operation of latch 410 in the above-described manner also causes its ear 443 to actuate switch SW11 from its normal position shown in FIG. 10 wherein its contact SW11*a* engages contact SW11*b*, to its actuated position wherein contact SW11*a* engages contact SW11*c*. This is the condition that switch SW11 is found at the beginning of the next succeeding cycle, and its significance will be described below in connection with the condition of the electrical circuit at the beginning of that cycle.

Returning to the first cycle for this Amount and Account Number operation, it is seen that as soon as the amount stop 303 is lowered (and latched), the check is transported thereover by the feeding belt until it is intercepted by the account number stop 304, which had been raised before the machine cycle and had not been affected during the machine cycle. Thus, the check is not ejected from the apparatus at the completion of the cycle, as in the earlier-described operations, but rather it is automatically positioned for printing the account number in the account number encoding field of the check.

The operator would then introduce the account number into the same keyboard 3 of the adding machine unit by depressing the appropriate numerical keys 8 representative of the account number, and would then depress A/C key 10″ (as distinguished from Item key 10′) to initiate the second cycle for printing the account number on the check.

With the check properly positioned by the account number stop 304, the condition of the electrical circuit would be exactly the same as described in connection with the Account Number operation, except for the circuit for energizing account number relay RA. Lever 300, being in its "C" position, does not actuate switch S12 from the position illustrated in FIG. 10. However, switch SW11, controlled by ear 443 of latch 410, having been actuated during the first cycle, now engages its contact SW11*c* with its movable contact SW11*a*. Accordingly, the energizing circuit to account number relay RA is now completed through contacts SW12*a* and SW12*b* of switch SW12 and contacts SW11*a* and SW11*c* of switch SW11. With relay RA energized, it is seen that A/C key 10″ and that the account number stop 304 are effective to control the energization of cycling solenoid S1, in the same manner as described above in connection with the Account Number operation.

During the machine cycle, the elements of the machine will function in the same manner as described above in connection with an Account Number cycle of operation with the following exceptions: Latch 410 is released to permit the amount stop 303 to assume its normally raised position at the end of the second cycle, so that it is in condition for intercepting a check in the next succeeding cycle for printing in the amount encoding field. Also, the detent 329 for program plate 325 is released, tending to restore the program plate 325 to its "B" position for performing an Amount operation during the next succeeding cycle.

For releasing latch 410 during the second cycle of the Amount and Account Number operation, pin 417 carried on arm 382, engaging the underside of latch 410, will rock the latch free of stud 412 when arm 382 is rocked against pin 304′ to lower the account number stop 304 following the 195° point of the cycle to permit the check to pass thereover. The rocking of latch 410 releases bail 375 and enables the amount stop 303 to restore to its normally raised position.

For tending to restore program plate 325, when arm 382 moves to lower the account number stop 304 its end 417 engages detent roll 329 so as to unseat the detent from groove 327C of the program plate. This will permit the program plate to be rocked under the influence of spring 353, whereupon it would normally assume the position where lever 300 occupies its "B" position against separator 313 of slotted plate 11, and detent 329 seats in groove 327B of the program plate 325. The purpose of this arrangement, as described above, is to permit the lever to be automatically restored to its "B" position for printing amounts, since the Amount operation would normally be the one most frequently performed. Should it be desired, however, to perform in repeated Amount and Account Number operations, the lever 300 would be flexed sideways in its "C" position until it is seated and latched behind extension 314″ of separator 314. This will prevent the lever 300, and thereby program plate 325, from restoring to their "B" positions.

(4) *Reject operation.*—Reject lever 301 is operated in order to eject the check without cycling the machine, this operation lowering both of the stops 303 and 304 and thereby allowing the check to be fed through the machine and into the receiving hopper 6.

Operation of lever 301 rocks bail 420, through linkages 425–439 as described above, causing the lowering of its two arms 421 and 422 against pin 303′ for amount stop 303 and pin 304′ for account number stop 304. This rocking of the bail and lowering of its arms will depress both of the stops 303 and 304 which will remain depressed so long as the lever 301 is held in its moved position. When lever 301 is released after the check is ejected, bail 420 is returned to its normal position by its spring 438, thereby allowing the two stops 303 and 304 to rise under the influence of their own springs 363. Of course, only that stop, or those stops, not held down by the setting of control lever 300 will actually rise when lever 301 is released.

While the invention has been described with respect to a preferred embodiment thereof, it will be understood that the invention and/or various features thereof are capable of embodiment in other forms and that many changes and variations may be made within the spirit and scope of the invention as described in the following claims.

We claim:

1. Recording apparatus comprising recording means settable in accordance with information to be recorded; means for transporting a record meduim having a plurality of recording fields through a feeding path in said apparatus; means for driving said apparatus through cycles of operation; a first record stop in the feeding path of said record medium and operable, when active, to intercept said record medium when one of its recording fields is positioned with respect to said recording means for recording thereon during a cycle of operation; a second record stop in the feeding path of said record medium and operable, when active, to intercept said record medium when a different recording field is positioned with respect to said recording means for recording thereon during a cycle of operation; and means for selectively activating said record stops; said means comprising a member settable in a plurality of positions; means for causing said first stop to be active when said settable member is set in one position; means for causing said second stop to be active when said settable member is set in a second position; and means operative when said settable member is set in a third position to cause said first stop to be active during one cycle of operation and said second stop to be active during the immediately succeeding cycle of operation.

2. Printing apparatus comprising printing elements settable in accordance with information to be recorded; a continuously driven belt for transporting a record medium having a plurality of recording fields through a feeding path in said apparatus; means for driving said apparatus through cycles of operation; a first record stop in the feeding path of said record medium and operable, when raised, to intercept said record medium when one of its recording fields is positioned with respect to said printing elements for printing therein during a cycle of operation; a second record stop in the feeding path of said record medium and operable, when raised, to intercept said record medium when a different recording field is positioned with respect to said printing elements for printing therein during a cycle of operation; and means for selectively raising said record stops; said means comprising a member manually settable in a plurality of positions; means for causing said first stop to be raised when said settable member is set in one position; means for causing said second stop to be raised when said settable member is set in a second position; and means operative when said settable member is set in a third position to cause said first stop to be raised during one cycle of operation, and for causing said first stop to be lowered and said second stop to be raised during the immediately succeeding cycle of operation.

3. Recording apparatus comprising a keyboard for introducing information into said apparatus; a plurality of differentially settable recording elements for representing said information; means for transporting a record medium having a plurality of recording fields through a feeding path in said apparatus; means for initiating machine cycles of operation; a first record stop in the feeding path of said record medium and operable, when raised, to intercept said record medium when a first recording field is positioned with respect to said recording elements for recording said introduced information in said one recording field during a machine cycle; a second record stop in the feeding path of said record medium and operable, when raised, to intercept said record medium when a second recording field is positioned with respect to said recording elements for recording said introduced information in said second recording field during a machine cycle; control means comprising a settable control member for selectively raising said record stops at the beginning of a machine cycle and thereby predetermining in which field said introduced information will be recorded; means for sensing the initial positions of said record stops; and means for preventing the initiation of a machine cycle if the record stops are not in their preselected initial positions determined by said settable control member.

4. Recording apparatus as defined in claim 3 wherein said settable control member is manually settable in a plurality of positions; said apparatus further comprising means operative at the setting of said control member in one position to raise said first stop at the beginning of a machine cycle and to lower said first stop during the machine cycle; and means operative at the setting of said control member in a second position to lower said first stop and to raise said second stop at the beginning of a machine cycle and to lower said second stop during the machine cycle.

5. Recording apparatus comprising recording means; means for introducing information into said apparatus for setting said recording means; means for transporting a record medium having a plurality of recording fields through a feeding path in said apparatus; means for initiating machine cycles of operation; a first record stop in the feeding path of said record medium and operable, when raised, to intercept said record medium when a first recording field is positioned with respect to said recording means for recording said introduced information in said one recording field during a machine cycle; a second record stop in the feeding path of said record medium and operable, when raised, to intercept said record medium when a second recording field is positioned with respect to said recording means for recording said introduced information in said second recording field during a machine cycle; control means comprising a settable control member for selectively raising said record stops and thereby predetermining in which field said introduced information will be recorded; said settable control member being settable in a plurality of positions; means operative at the setting of said control member in one position to raise said first stop at the beginning of a machine cycle and to lower said first stop during the machine cycle; means operative at the setting of said control member in a second position to lower said first stop and to raise said second stop at the beginning of a machine cycle and to lower said second stop during the machine cycle; and means operative at the setting of said control member in a third position to raise both said first and second stops at the beginning of a machine cycle, and, during the said cycle, to lower said first stop and to latch same in its lowered position, whereby said second stop will intercept said record medium at the beginning of the immediately succeeding machine cycle.

6. Recording apparatus as defined in claim 5 further including means operative during said succeeding cycle to unlatch said first stop to permit same to restore to its raised position for intercepting said record medium at the beginning of the following cycle.

7. Recording apparatus as defined in claim 5 further including means operative during said succeeding cycle to return said manually settable control member to said first position.

8. Recording apparatus as defined in claim 5 wherein said control means includes a program plate coupled to said settable control member so as to be movable therewith, and means for releasably retaining said program plate in its moved position.

9. Recording apparatus as defined in claim 3 wherein said keyboard also contains a first operational control key corresponding to said first recording field and a second operational control key corresponding to said second recording field; and wherein said means for initiating machine cycles comprises means for sensing the depression of a numerical key and the operational control key corresponding to the predetermined recording field to receive said introduced information.

10. Recording apparatus as defined in claim 3 further including a manipulatable reject lever; and means for lowering both said record stops upon manipulation of said reject lever.

11. Recording apparatus comprising recording means settable in accordance with information to be recorded; means for transporting a record medium through said apparatus; means for driving said apparatus through a cycle of operation; a record stop in the feeding path of said record medium and operable, when raised, to intercept said record medium in recording position with respect to said recording means; a control member settable to a plurality of positions; means normally maintaining said record stop in raised position; a pin carried by said record stop; a pair of elements engageable with said pin and operable to lower said stop; means operative by the setting of said control member to a first position for moving one of said elements against said pin to lower said stop before the start of a machine cycle; and means operative by the setting of said control member to a second position for moving the second of said elements against said pin to lower said stop during a machine cycle.

12. Recording apparatus comprising recording means settable in accordance with information to be recorded; means for transporting a record medium through said apparatus; means for driving said apparatus through cycles of operation; a record stop in the feeding path of said record medium and operable, when raised, to intercept said record medium in recording position with respect to said recording means; a control member manually settable in a plurality of positions; a manipulatable reject member; means normally maintaining said record stop in raised position; and a plurality of elements operable to lower the stop; one of said elements being operable to lower said stop before a machine cycle when said control member is set in a first position; a second of said elements being operable to lower said stop during a machine cycle when said control member is set in a second position; and a third element operable to lower said stop at any time that said reject member is manipulated.

13. Printing apparatus comprising differentially settable printing elements; a keyboard for introducing information to be printed; a continuously driven belt for transporting a record medium through a feeding path in said apparatus; means for driving said apparatus through cycles of operation; a record stop in the feeding path of said record medium and operable, when raised, to intercept said record medium in printing position with respect to said printing elements; a control member manually settable in a plurality of positions; a manipulatable reject member; spring means normally maintaining said record stop in raised position; and a plurality of elements engageable with said stop and operable to lower same; one of said elements being operable to lower said stop by said control member when the control member is manually set in a first position; a second of said elements being operable to lower said stop during a machine cycle when said control member is manually set in a second position; and a third element operable to lower said stop when said reject member is manipulated.

References Cited in the file of this patent

UNITED STATES PATENTS

| | | |
|---|---|---|
| 1,717,231 | Krell | June 11, 1929 |
| 1,900,281 | Gollwitzer | Mar. 7, 1933 |
| 2,050,745 | Woodruff | Aug. 11, 1936 |
| 2,211,310 | Andrews | Aug. 13, 1940 |
| 2,645,994 | Carroll | July 21, 1953 |